United States Patent
Zhou et al.

(10) Patent No.: US 11,950,113 B2
(45) Date of Patent: Apr. 2, 2024

(54) PRIORITIZATIONS DURING BEAM FAILURE RECOVERY

(71) Applicant: QUALCOMM INCORPORATED, San Diego, CA (US)

(72) Inventors: Yan Zhou, San Diego, CA (US); Tao Luo, San Diego, CA (US); Makesh Pravin John Wilson, San Diego, CA (US); Tianyang Bai, Somerville, NJ (US); Kiran Venugopal, Raritan, NJ (US)

(73) Assignee: QUALCOMM Incorporated, San Diego, CA (US)

(*) Notice: Subject to any disclaimer, the term of this patent is extended or adjusted under 35 U.S.C. 154(b) by 248 days.

(21) Appl. No.: 17/453,938

(22) Filed: Nov. 8, 2021

(65) Prior Publication Data
US 2022/0060914 A1    Feb. 24, 2022

Related U.S. Application Data

(62) Division of application No. 16/539,021, filed on Aug. 13, 2019, now Pat. No. 11,172,386.

(60) Provisional application No. 62/727,523, filed on Sep. 5, 2018, provisional application No. 62/726,972, filed on Sep. 4, 2018.

(51) Int. Cl.
H04W 24/04    (2009.01)

(52) U.S. Cl.
CPC .................................. H04W 24/04 (2013.01)

(58) Field of Classification Search
CPC ...... H04W 24/04; H04B 7/088; H04B 7/0695
See application file for complete search history.

(56) References Cited

U.S. PATENT DOCUMENTS

| | | | |
|---|---|---|---|
| 9,444,586 B2 | 9/2016 | Vajapeyam et al. | |
| 2018/0302889 A1 | 10/2018 | Guo et al. | |
| 2019/0215896 A1* | 7/2019 | Zhou | H04L 1/0027 |
| 2019/0230730 A1* | 7/2019 | Wang | H04W 74/0833 |
| 2019/0306850 A1* | 10/2019 | Zhang | H04B 7/0626 |
| 2020/0077283 A1 | 3/2020 | Zhou et al. | |

FOREIGN PATENT DOCUMENTS

| | | |
|---|---|---|
| CN | 107079459 A | 8/2017 |
| WO | WO-2015054275 | 4/2015 |

OTHER PUBLICATIONS

International Search Report and Written Opinion—PCT/US2019/046480—ISA/EPO—dated Jan. 13, 2020.

(Continued)

*Primary Examiner* — Mohammad S Anwar
(74) *Attorney, Agent, or Firm* — Holland & Hart LLP

(57) ABSTRACT

Methods, systems, and devices for wireless communications are described. A user equipment (UE) may determine, during a beam failure recovery period, that a configured control resource set at least partially overlaps with a beam failure recovery control resource set. The UE may configure, based at least in part on the at least partial overlap, a receive beam to receive the beam failure recovery control resource set. The UE may receive a control signal over the beam failure recovery control resource set during the beam failure recovery period.

20 Claims, 17 Drawing Sheets

(56) References Cited

OTHER PUBLICATIONS

LG Electronics: "Remaining Issues on PDCCH Structure", 3GPP Draft, 3GPP TSG RAN WG1 Meeting #93, R1-1806615, 3rd Generation Partnership Project (3GPP), Mobile Competence Centre, 650, Route Des Lucioles, F-06921 Sophia-Antipolis Cedex, France, vol. RAN WG1, No. Busan, Korea, May 21, 2018-May 25, 2018, May 20, 2018 (May 20, 2018), pp. 1-4, XP051441817, Retrieved from the Internet: URL: http://www.3gpp.org/ftp/Meetings%5F3GPP%5FSYNC/RAN1/Docs/ [retrieved on May 20, 2018] section 2.1, proposal 1, last paragraph, section 2.2.

Nokia, et al., "Remaining Details on Beam Recovery", 3GPP TSG-RAN WG1 Meeting #93, 3GPP Draft; R1-1807185, 3rd Generation Partnership Project (3GPP), Mobile Competence Centre; 650, Route Des Lucioles; F-06921 Sophia-Antipolis Cedex; France, vol. RAN WG1, No. Busan, Korea; May 20, 2018 (May 20, 2018), 10 Pages, XP051442382, Retrieved from the Internet: URL: http://www.3gpp.org/ftp/Meetings%5F3GPP%5FSYNC/RAN1/Docs/ [retrieved on May 20, 2018] p. 6.

Partial International Search Report—PCT/US2019/046480—ISA/EPO—dated Nov. 5, 2019.

Qualcomm Incorporated: "Beam Recovery Procedures", 3GPP TSG RAN WG1 Meeting #92, 3GPP Draft; R1-1802824, 3rd Generation Partnership Project (3GPP), Mobile Competence Centre; 650, Route Des Lucioles; F-06921 Sophia-Antipolis Cedex; France, vol. RAN WG1, No. Athens, Greece; Feb. 26, 2018-Mar. 2, 2018, Feb. 17, 2018 (Feb. 17, 2018), pp. 1-11, XP051398237, Retrieved from the Internet: URL: http://www.3gpp.org/ftp/tsg%5Fran/WG1%5FRL1/TSGR1%5F92/Docs/ [retrieved on Feb. 17, 2018] pp. 5,6,8,9.

\* cited by examiner

PRIORITIZATIONS DURING BEAM FAILURE RECOVERY

CROSS REFERENCE

The present application for patent is a Divisional of U.S. patent application Ser. No. 16/539,021 by ZHOU et al., entitled "PRIORITIZATIONS DURING BEAM FAILURE RECOVERY" filed Aug. 13, 2019, which claims the benefit of U.S. Provisional Patent Application No. 62/726,972 by ZHOU et al., entitled "PRIORITIZATIONS DURING BEAM FAILURE RECOVERY," filed Sep. 4, 2018, and to U.S. Provisional Patent Application No. 62/727,523 by ZHOU et al., entitled "PRIORITIZATIONS DURING BEAM FAILURE RECOVERY," filed Sep. 5, 2018, both of which are assigned to the assignee hereof, and expressly incorporated by reference.

BACKGROUND

The following relates generally to wireless communications, and more specifically to prioritizations during beam failure recovery.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), orthogonal frequency divisional multiplexing (OFDM) or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

Wireless communication systems may operate in millimeter wave (mmW) frequency ranges, e.g., 28 GHz, 40 GHz, 60 GHz, etc. Wireless communications at these frequencies may be associated with increased signal attenuation (e.g., path loss), which may be influenced by various factors, such as temperature, barometric pressure, diffraction, etc. As a result, signal processing techniques, such as beamforming, may be used to coherently combine energy and overcome the path losses at these frequencies. Due to the increased amount of path loss in mmW communication systems, transmissions from the base station and/or the UE may be beamformed. Moreover, a receiving device may use beamforming techniques to configure antenna(s) and/or antenna array(s) such that transmissions are received in a directional manner.

In some aspects, wireless communication systems operating in the mmW frequency ranges may result in a loss of communications due to a beam failure event. For example, due to UE mobility, blocking, and the like, the current transmit/receive beam pair for the UE and/or the base station may suddenly become unavailable or otherwise unusable. When this occurs, a beam recovery procedure is typically implemented in order to identify and activate a new beam to use for communications. However, in some instances conventional techniques may disrupt that beam failure recovery procedure, which may further exacerbate the beam failure event, e.g., may increase the duration of the beam failure event, may require additional resources/signaling in order to identify and configure the new beam, and the like.

SUMMARY

The described techniques relate to improved methods, systems, devices, and apparatuses that support prioritizations during beam failure recovery. Generally, the described techniques provide for a mechanism for improved prioritization techniques during a beam failure event. In some aspects, this may include prioritizing control resources (e.g., a control resource set (coreset), a search space, and the like) that are associated with the beam recovery procedure over other configured control resources (or coresets). For example, the UE may determine, during a beam failure recovery (BFR) period, that configured coreset(s) at least partially overlap with a BFR coreset (or search space), e.g., overlap in time and/or frequency. In some aspects, this may result in the UE having to choose between using its available receive beam to receive control information or signaling over the BFR coreset or to use its available receive beam to receive other control information over the configured coresets. Prioritizing the BFR coreset during the beam failure recovery period may allow the UE to receive the control signal for the beam recovery procedure. In some aspects, the base station may implement this technique by avoiding scheduling overlapping coresets between the configured coresets and the BFR coreset.

In another aspect, the described techniques improve reception of data associated with the beam recovery procedure. For example, the UE may be configured with a default receive beam (e.g., a second receive beam associated with the configured coresets) that is based on a coreset having the lowest identifier and an active transmission configuration information (TCI) state. During a beam failure event, the UE may identify a different receive beam (e.g., a first receive beam that is associated with a BFR coreset) to use for receiving the beam recovery signal(s). Accordingly and based on the beam failure event occurring, the UE may discard the default receive beam and instead use the first receive beam for receiving a BFR signal and some or all of the BFR data signal(s). In some aspects, this may include the UE using the first receive beam during a beam switch latency period that is associated with the UE, e.g., until the UE can decode the BFR signal (e.g., downlink control information (DCI)) to determine which receive beam is scheduled for receiving the BFR data signal(s).

In another aspect, the described techniques may be utilized to support prioritization of coreset that are associated with a beam failure recovery event over other configured coresets. For example, the UE may determine that the beam failure event has occurred and that the number of coresets configured for the UE has exceeded a threshold (e.g., the coresets are overbooked). Generally, the coresets may include at least one BFR coreset and one or more other configured coreset. The UE may prioritize monitoring the BFR coreset (e.g., may drop one or more of the other configured coresets) during a BFR period.

A method of wireless communication at a UE is described. The method may include determining, during a beam failure recovery period, that a configured control resource set at least partially overlaps with a beam failure recovery control resource set, configuring, based on the at least partial overlap, a receive beam to receive the beam failure recovery control resource set, and receiving a control signal over the beam failure recovery control resource set during the beam failure recovery period.

An apparatus for wireless communication at a UE is described. The apparatus may include a processor, memory in electronic communication with the processor, and instructions stored in the memory. The instructions may be executable by the processor to cause the apparatus to determine, during a beam failure recovery period, that a configured control resource set at least partially overlaps with a beam failure recovery control resource set, configure, based on the at least partial overlap, a receive beam to receive the beam failure recovery control resource set, and receive a control signal over the beam failure recovery control resource set during the beam failure recovery period.

Another apparatus for wireless communication at a UE is described. The apparatus may include means for determining, during a beam failure recovery period, that a configured control resource set at least partially overlaps with a beam failure recovery control resource set, configuring, based on the at least partial overlap, a receive beam to receive the beam failure recovery control resource set, and receiving a control signal over the beam failure recovery control resource set during the beam failure recovery period.

A non-transitory computer-readable medium storing code for wireless communication at a UE is described. The code may include instructions executable by a processor to determine, during a beam failure recovery period, that a configured control resource set at least partially overlaps with a beam failure recovery control resource set, configure, based on the at least partial overlap, a receive beam to receive the beam failure recovery control resource set, and receive a control signal over the beam failure recovery control resource set during the beam failure recovery period.

Some examples of the method, apparatuses, and non-transitory computer-readable medium described herein may further include operations, features, means, or instructions for determining that a beam failure event may have occurred, transmitting, based on the occurrence of the beam failure event, a beam failure recovery request to a base station using a transmit beam and identifying the receive beam based on the transmit beam.

Some examples of the method, apparatuses, and non-transitory computer-readable medium described herein may further include operations, features, means, or instructions for monitoring a set of candidate beams transmitted from the base station and selecting the transmit beam from the set of candidate beams.

In some examples of the method, apparatuses, and non-transitory computer-readable medium described herein, the beam failure recovery period includes a time period between transmitting a beam failure recovery request signal and receiving the control signal, where the control signal includes at least a portion of a beam failure recovery response.

In some examples of the method, apparatuses, and non-transitory computer-readable medium described herein, the beam failure recovery period includes a time period between transmitting a beam failure recovery request signal and receiving a signal activating a transmission configuration information state.

In some examples of the method, apparatuses, and non-transitory computer-readable medium described herein, the signal includes a Radio Resource Control (RRC) signal, or a MAC CE, or a combination thereof.

In some examples of the method, apparatuses, and non-transitory computer-readable medium described herein, the at least partial overlap includes a time domain overlap, or a frequency domain overlap, or a combination thereof.

In some examples of the method, apparatuses, and non-transitory computer-readable medium described herein, the control signal includes at least a portion of a beam failure recovery response.

A method of wireless communication at a base station is described. The method may include determining that a beam failure event has occurred for a UE, configuring, based on the determining, a beam failure recovery control resource set and one or more configured control resource sets for the UE, where the beam failure recovery control resource set does not overlap with the one or more configured control resource sets, and transmitting, based on the determining, a control signal over the beam failure recovery control resource set.

An apparatus for wireless communication at a base station is described. The apparatus may include a processor, memory in electronic communication with the processor, and instructions stored in the memory. The instructions may be executable by the processor to cause the apparatus to determine that a beam failure event has occurred for a UE, configure, based on the determining, a beam failure recovery control resource set and one or more configured control resource sets for the UE, where the beam failure recovery control resource set does not overlap with the one or more configured control resource sets, and transmit, based on the determining, a control signal over the beam failure recovery control resource set.

Another apparatus for wireless communication at a base station is described. The apparatus may include means for determining that a beam failure event has occurred for a UE, configuring, based on the determining, a beam failure recovery control resource set and one or more configured control resource sets for the UE, where the beam failure recovery control resource set does not overlap with the one or more configured control resource sets, and transmitting, based on the determining, a control signal over the beam failure recovery control resource set.

A non-transitory computer-readable medium storing code for wireless communication at a base station is described. The code may include instructions executable by a processor to determine that a beam failure event has occurred for a UE, configure, based on the determining, a beam failure recovery control resource set and one or more configured control resource sets for the UE, where the beam failure recovery control resource set does not overlap with the one or more configured control resource sets, and transmit, based on the determining, a control signal over the beam failure recovery control resource set.

In some examples of the method, apparatuses, and non-transitory computer-readable medium described herein, the beam failure recovery control resource set and one or more configured control resource sets may be configured to not overlap prior to the occurrence of the beam failure event.

In some examples of the method, apparatuses, and non-transitory computer-readable medium described herein, the beam failure recovery control resource set and one or more configured control resource sets may be configured to not overlap in response to the occurrence of the beam failure event and during a beam failure recovery period.

Some examples of the method, apparatuses, and non-transitory computer-readable medium described herein may further include operations, features, means, or instructions for receiving a beam failure recovery request from the UE, where the occurrence of the beam failure event may be based on the beam failure recovery request.

In some examples of the method, apparatuses, and non-transitory computer-readable medium described herein, the control signal includes at least a portion of a beam failure recovery response.

A method of wireless communication at a UE is described. The method may include determining that a beam failure event has occurred for the UE, identifying, during a beam failure recovery period associated with the beam failure event, a first receive beam associated with a beam failure recovery control resource set and a second receive beam associated with a configured control resource set that is configured for the UE during the beam failure recovery period, discarding the second receive beam in response to the occurrence of the beam failure event, and receiving, using the first receive beam, a beam failure recovery signal and at least a portion of a beam failure recovery data signal during a beam switch latency period associated with the UE.

An apparatus for wireless communication at a UE is described. The apparatus may include a processor, memory in electronic communication with the processor, and instructions stored in the memory. The instructions may be executable by the processor to cause the apparatus to determine that a beam failure event has occurred for the UE, identify, during a beam failure recovery period associated with the beam failure event, a first receive beam associated with a beam failure recovery control resource set and a second receive beam associated with a configured control resource set that is configured for the UE during the beam failure recovery period, discard the second receive beam in response to the occurrence of the beam failure event, and receive, using the first receive beam, a beam failure recovery signal and at least a portion of a beam failure recovery data signal during a beam switch latency period associated with the UE.

Another apparatus for wireless communication at a UE is described. The apparatus may include means for determining that a beam failure event has occurred for the UE, identifying, during a beam failure recovery period associated with the beam failure event, a first receive beam associated with a beam failure recovery control resource set and a second receive beam associated with a configured control resource set that is configured for the UE during the beam failure recovery period, discarding the second receive beam in response to the occurrence of the beam failure event, and receiving, using the first receive beam, a beam failure recovery signal and at least a portion of a beam failure recovery data signal during a beam switch latency period associated with the UE.

A non-transitory computer-readable medium storing code for wireless communication at a UE is described. The code may include instructions executable by a processor to determine that a beam failure event has occurred for the UE, identify, during a beam failure recovery period associated with the beam failure event, a first receive beam associated with a beam failure recovery control resource set and a second receive beam associated with a configured control resource set that is configured for the UE during the beam failure recovery period, discard the second receive beam in response to the occurrence of the beam failure event, and receive, using the first receive beam, a beam failure recovery signal and at least a portion of a beam failure recovery data signal during a beam switch latency period associated with the UE.

Some examples of the method, apparatuses, and non-transitory computer-readable medium described herein may further include operations, features, means, or instructions for identifying, based on the beam failure recovery signal, a third receive beam and receiving, using the third receive beam, a second portion of the beam failure recovery data signal after the beam switch latency period associated with the UE.

Some examples of the method, apparatuses, and non-transitory computer-readable medium described herein may further include operations, features, means, or instructions for transmitting, based on the occurrence of the beam failure event, a beam failure recovery request to a base station using a transmit beam and identifying the first receive beam based on the transmit beam.

Some examples of the method, apparatuses, and non-transitory computer-readable medium described herein may further include operations, features, means, or instructions for monitoring a set of candidate beams transmitted from the base station and selecting the transmit beam from the set of candidate beams.

In some examples of the method, apparatuses, and non-transitory computer-readable medium described herein, the configured control signal may be associated with a control resource set having a lowest available identifier and an associated transmission configuration information state.

In some examples of the method, apparatuses, and non-transitory computer-readable medium described herein, the first and second receive beams may be associated with a receiving physical downlink shared channel (PDSCH) during at least a portion of the beam switch latency period associated with the UE.

Some examples of the method, apparatuses, and non-transitory computer-readable medium described herein may further include operations, features, means, or instructions for discarding the second receive beam when the beam failure recovery control resource set may have an associated transmission opportunity in a same slot as the configured control resource set.

Some examples of the method, apparatuses, and non-transitory computer-readable medium described herein may further include operations, features, means, or instructions for receiving, using the first receive beam, the beam failure recovery signal that overlaps with a resource for a downlink or an uplink transmission scheduled by the configured control resource set.

In some examples of the method, apparatuses, and non-transitory computer-readable medium described herein, the configured control resource set scheduling the downlink or the uplink transmission occurs before or after the downlink or the uplink transmission of a beam failure recovery request.

Some examples of the method, apparatuses, and non-transitory computer-readable medium described herein may further include operations, features, means, or instructions for transmitting an acknowledgement/negative acknowledgement for the scheduled downlink transmission.

Some examples of the method, apparatuses, and non-transitory computer-readable medium described herein may further include operations, features, means, or instructions for refraining from transmitting an acknowledgement/negative acknowledgement for the scheduled downlink transmission.

A method of wireless communication at a base station is described. The method may include determining that a beam failure event has occurred for a UE, identifying a beam switch latency period associated with the UE, transmitting, based on the beam failure event occurring, a control signal to the UE, and transmitting a data signal to the UE during a portion of the slot that occurs after the beam switch latency period of the UE.

An apparatus for wireless communication at a base station is described. The apparatus may include a processor, memory in electronic communication with the processor, and instructions stored in the memory. The instructions may be executable by the processor to cause the apparatus to determine that a beam failure event has occurred for a UE, identify a beam switch latency period associated with the UE, transmit, based on the beam failure event occurring, a control signal to the UE, and transmit a data signal to the UE during a portion of the slot that occurs after the beam switch latency period of the UE.

Another apparatus for wireless communication at a base station is described. The apparatus may include means for determining that a beam failure event has occurred for a UE, identifying a beam switch latency period associated with the UE, transmitting, based on the beam failure event occurring, a control signal to the UE, and transmitting a data signal to the UE during a portion of the slot that occurs after the beam switch latency period of the UE.

A non-transitory computer-readable medium storing code for wireless communication at a base station is described. The code may include instructions executable by a processor to determine that a beam failure event has occurred for a UE, identify a beam switch latency period associated with the UE, transmit, based on the beam failure event occurring, a control signal to the UE, and transmit a data signal to the UE during a portion of the slot that occurs after the beam switch latency period of the UE.

Some examples of the method, apparatuses, and non-transitory computer-readable medium described herein may further include operations, features, means, or instructions for determining to transmit the data signal during the portion of the slot that occurs after the beam switch latency period prior to the occurrence of the beam failure event.

Some examples of the method, apparatuses, and non-transitory computer-readable medium described herein may further include operations, features, means, or instructions for determining to transmit the data signal during the portion of the slot that occurs after the beam switch latency period prior to the occurrence of the beam failure event in response to the occurrence of the beam failure event.

A method of wireless communication at a UE is described. The method may include determining that a beam failure event has occurred, determining that a number of control resource sets has exceeded a threshold based on the occurrence of the beam failure event, where the control resource sets include a beam failure recovery control resource set and one or more configured control resource sets, and prioritizing a monitoring of the beam failure recovery control resource set over the one or more configured control resource sets during a beam failure recovery period.

An apparatus for wireless communication at a UE is described. The apparatus may include a processor, memory in electronic communication with the processor, and instructions stored in the memory. The instructions may be executable by the processor to cause the apparatus to determine that a beam failure event has occurred, determine that a number of control resource sets has exceeded a threshold based on the occurrence of the beam failure event, where the control resource sets include a beam failure recovery control resource set and one or more configured control resource sets, and prioritize a monitoring of the beam failure recovery control resource set over the one or more configured control resource sets during a beam failure recovery period.

Another apparatus for wireless communication at a UE is described. The apparatus may include means for determining that a beam failure event has occurred, determining that a number of control resource sets has exceeded a threshold based on the occurrence of the beam failure event, where the control resource sets include a beam failure recovery control resource set and one or more configured control resource sets, and prioritizing a monitoring of the beam failure recovery control resource set over the one or more configured control resource sets during a beam failure recovery period.

A non-transitory computer-readable medium storing code for wireless communication at a UE is described. The code may include instructions executable by a processor to determine that a beam failure event has occurred, determine that a number of control resource sets has exceeded a threshold based on the occurrence of the beam failure event, where the control resource sets include a beam failure recovery control resource set and one or more configured control resource sets, and prioritize a monitoring of the beam failure recovery control resource set over the one or more configured control resource sets during a beam failure recovery period.

Some examples of the method, apparatuses, and non-transitory computer-readable medium described herein may further include operations, features, means, or instructions for determining an identifier associated with each control resource set and dropping one or more control resource sets based on the corresponding identifier, where the identifier for the beam failure recovery control resource set may be lower than the identifiers corresponding to the dropped one or more control resource sets.

Some examples of the method, apparatuses, and non-transitory computer-readable medium described herein may further include operations, features, means, or instructions for determining that an identifier for at least one of the control resource sets identifies the at least one of the control resource sets as the beam failure recovery control resource set and dropping one or more control resource sets other than the beam failure recovery control resource set based on the corresponding identifier.

A method of wireless communication at a base station is described. The method may include determining that a beam failure event has occurred for a UE, configuring a set of control resource sets for the UE based on the determining, where the control resource sets include a beam failure recovery control resource set and one or more configured control resource sets, and selecting an identifier for each control resource set, where the identifier for the beam failure recovery control resource set is lower than the identifiers for the one or more configured control resource sets.

An apparatus for wireless communication at a base station is described. The apparatus may include a processor, memory in electronic communication with the processor, and instructions stored in the memory. The instructions may be executable by the processor to cause the apparatus to determine that a beam failure event has occurred for a UE, configure a set of control resource sets for the UE based on the determining, where the control resource sets include a beam failure recovery control resource set and one or more configured control resource sets, and select an identifier for each control resource set, where the identifier for the beam failure recovery control resource set is lower than the identifiers for the one or more configured control resource sets.

Another apparatus for wireless communication at a base station is described. The apparatus may include means for determining that a beam failure event has occurred for a UE, configuring a set of control resource sets for the UE based on the determining, where the control resource sets include a beam failure recovery control resource set and one or more configured control resource sets, and selecting an identifier for each control resource set, where the identifier for the beam failure recovery control resource set is lower than the identifiers for the one or more configured control resource sets.

A non-transitory computer-readable medium storing code for wireless communication at a base station is described. The code may include instructions executable by a processor to determine that a beam failure event has occurred for a UE, configure a set of control resource sets for the UE based on the determining, where the control resource sets include a beam failure recovery control resource set and one or more configured control resource sets, and select an identifier for each control resource set, where the identifier for the beam failure recovery control resource set is lower than the identifiers for the one or more configured control resource sets.

Some examples of the method, apparatuses, and non-transitory computer-readable medium described herein may further include operations, features, means, or instructions for receiving a beam failure recovery request from the UE, where the occurrence of the beam failure event may be based on the beam failure recovery request.

In some examples of the method, apparatuses, and non-transitory computer-readable medium described herein, the control signal includes at least a portion of a beam failure recovery response.

DETAILED DESCRIPTION

Figure 1:
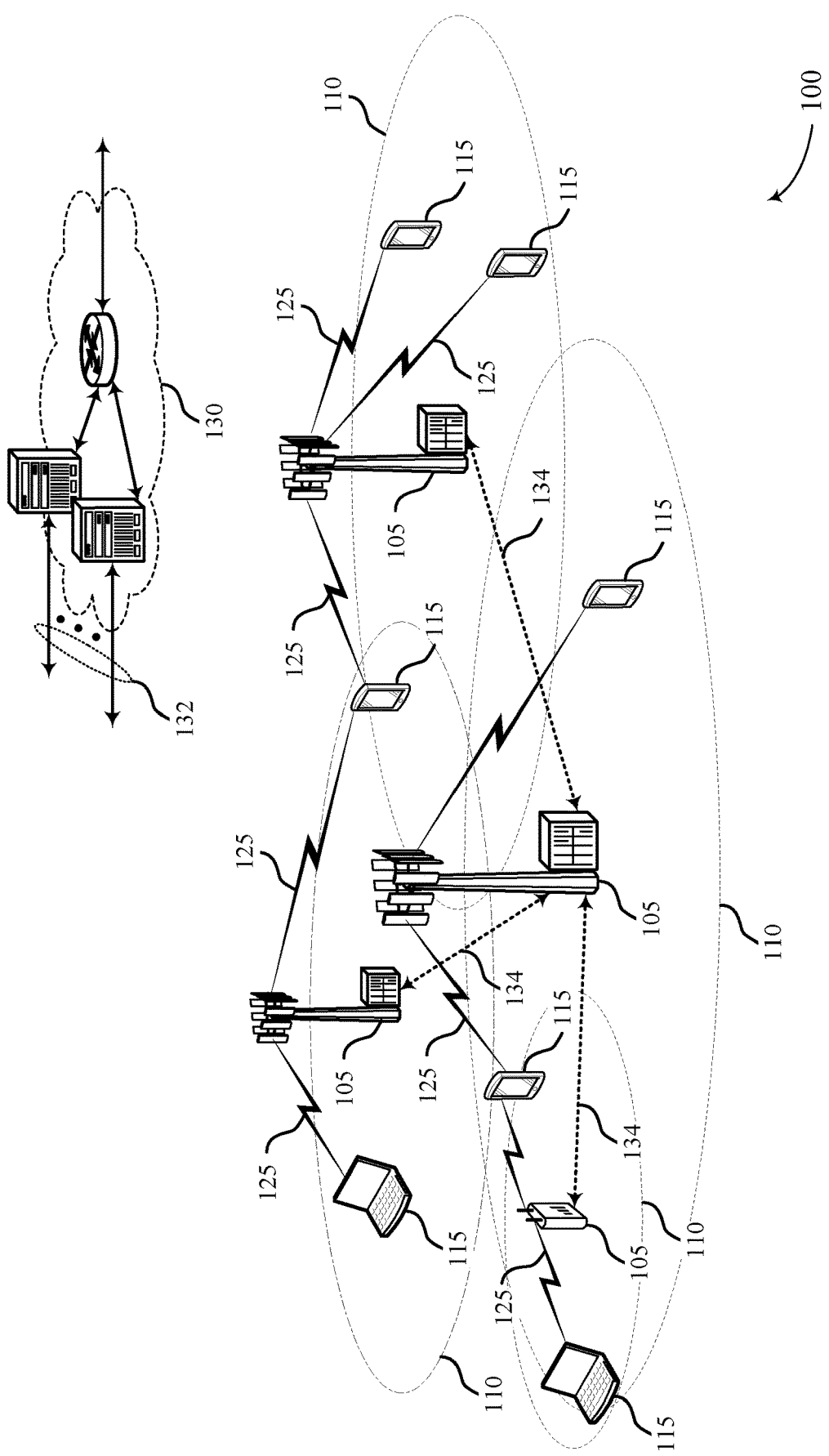
FIG. 1 illustrates an example of a system for wireless communications in accordance with aspects of the present disclosure.

Some wireless communication systems may operate in millimeter wave (mmW) frequency ranges (e.g., 28 GHz, 40 GHz, 60 GHz, etc.). In some cases, wireless communication at these frequencies may be associated with increased signal attenuation (e.g., path loss), which may be influenced by various factors, such as temperature, barometric pressure, diffraction, etc. As a result, signal processing techniques such as beamforming (i.e., directional transmission) may be used to coherently combine signal energy and overcome the path loss in specific beam directions. In some cases, a device may select an active beam for communicating with a network by selecting the strongest beam from among a number of candidate beams.

In some aspects, operations in the mmW network may be interrupted during a beam failure event. For example, the beam failure event may occur due to UE mobility, blocking, etc., which may result in the current beam (e.g., transmit and/or receive beam being used by the UE) becoming unavailable or otherwise unusable to continue using for wireless communications. According to conventional techniques, when a beam failure event occurs, the UE may determine or otherwise detect that the beam failure event has occurred. In response, the UE may monitor a set of beamformed signals (e.g., a set of candidate beams) being transmitted by the base station and identify a best beam, e.g., which beam is received with the highest receive power level, with the lowest interference level, and the like. The UE typically uses the best beam to transmit a beam failure recovery (BFR) request to the base station to initiate the BFR procedure. Typically, the BFR procedure includes the base station transmitting a signal (e.g., a physical downlink control channel (PDCCH) carrying a downlink control information (DCI)) that conveys or otherwise indicates a grant for a data signal (e.g., a physical downlink shared channel (PDSCH)). However, in some circumstances, conventional techniques may result in the UE being unable to receive the signal and/or the data signal for the BFR procedure. In some aspects, such conventional techniques may result in the loss of reception due to the UE being configured with coresets and/or other implementation techniques that prevent the UE from receiving the BFR signal and/or data signals.

Aspects of the disclosure are initially described in the context of a wireless communication system, such as a mmW network. In some aspects, wireless communication systems may be configured to support improved prioritization techniques in a BFR scenario. In one aspect, this may include prioritizing PDCCH (e.g., control signals or simply signals) transmitted on BFR control resource set (coreset) (e.g., on a search space (SS) associated with the BFR procedure (BFR-SS)) over PDCCH transmissions that are not associated with the BFR procedure (e.g., other configured PDCCH transmissions on configured coresets). As one example, this may include the UE determining that the BFR coreset at least partially overlaps (e.g., in time and/or frequency) with other configured coresets. In this instance, the UE may select or otherwise use the BFR coreset to receive a control signal as a part of a BFR procedure. In some aspects, this may include the base station being more particular about configuring coresets to avoid any overlap between BFR coreset and the other configured coresets (e.g., either in response to the BFR event occurring and/or on a more permanent basis).

Additionally or alternatively, aspects of the described techniques may support improved BFR data signal reception (e.g., PDSCH) during a BFR procedure. For example, the UE may be configured with a default receive beam (e.g., a second receive beam) to use to receive data signals. Conventionally, the default receive beam may be based on a coreset (e.g., a SS) having the lowest identifier value and having an associated transmission configuration information (TCI) state. However, in a BFR event the new best beam may not have a TCI state configured. For example, the UE may dynamically determine the best beam after the BFR event is detected based on a set of candidate beams transmitted from the base station. The UE may identify the best beam from the candidate transmit beams and use this information to select a transmit beam (and an associated receive beam, which may be referred to as a first receive beam) to use during the BFR procedure. The UE may transmit a BFR request using the identified transmit beam, and then use the associated receive beam to detect the BFR control signal on the BFR coreset. According to conventional techniques, the UE would be configured to switch to the default receive beam to receive data signals following the control signals. Instead, the UE may use the best beam (e.g., the first receive beam determined based on the candidate transmit beams from the base station) to continue to monitor for the BFR data signals for one or more symbols. For example, the UE may have an associated beam switch latency period that includes the time between when the BFR control signal is received and when the UE decodes the information in the BFR control signal (e.g., the downlink control information (DCI)) to determine which TCI state (and corresponding receive beam) to use to receive the BFR data signals. During the period of the beam switch latency, the UE may instead use the best receive beam (e.g., the first receive beam) to receive BFR data signals until the UE is able to decode the BFR control signal (e.g., the DCI).

In another aspect, the described techniques provide a mechanism where overbooking of coresets does not result in dropping of a BFR coreset. For example, the UE may determine that a certain number of coresets has exceeded a threshold (e.g., the coresets have been overbooked) during a BFR event. In response, the UE may prioritize monitoring the BFR coreset over the other configured coresets in order to ensure that the BFR control signals are received. That is, conventional techniques require the UE to drop overbooked coresets beginning with the coresets having the highest identifier value. However, according to aspects of the described techniques the UE may identify the BFR coreset from the other configured coresets and, when overbooked, drop one or more of the other configured coresets instead of the BFR coreset.

Aspects of the disclosure are further illustrated by and described with reference to apparatus diagrams, system diagrams, and flowcharts that relate to prioritizations during beam failure recovery.

FIG. 1 illustrates an example of a wireless communications system 100 in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data.

In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a set of antenna elements of an antenna array, or by processing received signals according to different receive beamforming weight sets applied to signals received at a set of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

A UE 115 may determine, during a beam failure recovery period, that a configured control resource set at least partially overlaps with a beam failure recovery control resource set. The UE 115 may configure, based at least in part on the at least partial overlap, a receive beam to receive the beam failure recovery control resource set. The UE 115 may receive a control signal over the beam failure recovery control resource set during the beam failure recovery period.

A base station 105 may determine that a beam failure event has occurred for a UE 115. The base station 105 may configure, based at least in part on the determining, a beam failure recovery control resource set and one or more configured control resource sets for the UE, where the beam failure recovery control resource set does not overlap with the one or more configured control resource sets. The base station 105 may transmit, based at least in part on the determining, a control signal over the beam failure recovery control resource set.

A UE 115 may determine that a beam failure event has occurred for the UE 115. The UE 115 may identify, during a beam failure recovery period associated with the beam failure event, a first receive beam associated with a beam failure recovery control resource set and a second receive beam associated with a configured control resource set that is configured for the UE during the beam failure recovery period. The UE 115 may discard the second receive beam in response to the occurrence of the beam failure event. The UE 115 may receive, using the first receive beam, a beam failure recovery signal and at least a portion of a beam failure recovery data signal during a beam switch latency period associated with the UE.

A base station 105 may determine that a beam failure event has occurred for a UE 115. The base station 105 may identify a beam switch latency period associated with the UE 115. The UE 115 may transmit, based at least in part on the beam failure event occurring, a control signal to the UE 115. The base station 105 may transmit a data signal to the UE 115 during a portion of the slot that occurs after the beam switch latency period of the UE 115.

A UE 115 may determine that a beam failure event has occurred. The UE 115 may determine that a number of control resource sets has exceeded a threshold based at least in part on the occurrence of the beam failure event, where the control resource sets include a beam failure recovery control resource set and one or more configured control resource sets. The UE 115 may prioritize a monitoring of the beam failure recovery control resource set over the one or more configured control resource sets during a beam failure recovery period.

A base station 105 may determine that a beam failure event has occurred for a UE 115. The base station 105 may configure a set of control resource sets for the UE 115 based at least in part on the determining, where the control resource sets include a beam failure recovery control resource set and one or more configured control resource sets. The base station 105 may select an identifier for each control resource set, where the identifier for the beam failure recovery control resource set is lower than the identifiers for the one or more configured control resource sets.

Figure 2:
FIG. 2 illustrates an example of a slot configuration in accordance with aspects of the present disclosure.

FIG. 2 illustrates an example of a slot configuration 200 in accordance with aspects of the present disclosure. In some examples, slot configuration 200 may implement aspects of wireless communication system 100. Aspects of slot configuration 200 may be implemented by UE and/or a base station, which may be examples of the corresponding devices described herein. In some aspects, slot configuration 200 may be implemented in a mmW network. In some aspects, slot 205 may be implemented or wireless communications, such as during a BFR event.

Generally, slot configuration 200 illustrates one example of a slot 205 that includes a control portion 210 and a data portion 215. Generally, the control portion 210 may include one or more coresets. Generally, a coreset may include various control resources, a search space, and the like. Examples of coresets may include one or more configured coresets 220 and one or more BFR coresets 225. The data portion 215 generally carries or otherwise conveys data signals configured by the coreset(s) in the control portion 210.

Typically, a BFR event may occur when the beam (e.g., transmit and/or receive beam) being used for wireless communications suddenly becomes unavailable or otherwise unusable. For example, the beam may become unavailable due to UE mobility, blocking, and the like. Another example may include the beam no longer be acceptable for wireless communications, e.g., due to the increased interference level, fading, and the like. Conventionally, the UE detecting a BFR event may begin monitoring a set of candidate beams transmitted from a base station to identify a new best beam. For example, the base station may transmit the set of candidate beams according to a known pattern and/or schedule, and may include an identifier for each candidate beam. The UE may receive one or more of the candidate beams and identify the best beam as the beam with the highest receive power level, with the lowest interference level, and the like. Based on this best beam identified from the set of candidate beams, the UE may to use the best beam for transmitting a BFR request to the base station. For example, the UE may identify its own transmit beam, as well as an associated receive beam to use during the BFR procedure based on the candidate beams.

The BFR request typically initiates the BFR procedure between the base station and the UE in order to identify a new beam to use for wireless communications. The BFR procedure typically has an associated BFR period, which may be defined in a number of ways. In one example, the BFR period may include the time between transmitting the BFR request and when a BFR response is received (e.g., when a control signal is received on coresets that are associated with the BFR procedure, such as a BFR coreset 225). In another example, the BFR period may include the time between transmitting the BFR request and receiving a signal activating a TCI state. For example, a higher layer signaling (e.g., MAC CE, RRC, or other higher layer signaling) may be received during the BFR procedure that completes the BFR procedure and ends the BFR period.

The typical BFR procedure includes the UE transmitting the BFR request to the base station, and the base station transmitting the BFR response to the UE. The BFR response may include control and/or data signals associated with the BFR procedure that are used to identify the new beam to be used between the base station and the UE. For example, the BFR response may include one or more control signals received on resources allocated to or otherwise associated with the BFR procedure (e.g., BFR coreset 225) that carry or otherwise convey an indication of resources to use for receiving data signals associated with the BFR procedure. However, conventional techniques may result in a loss of the BFR control signals and/or data signals by the UE. For example, conventional techniques may result in the UE being forced to monitor other resources, rather than the resources associated with the BFR response.

As one example, conventional wireless networks may be configured with various parameters and/or rules that are implemented during wireless communications and/or during a particular scenario. As one example and in the scenario where a BFR event has occurred, one rule may define which search space (e.g., which coreset) the UE monitors after transmitting the BFR request. For example, the conventional rules may require the UE, after transmitting the BFR request, to continue to monitor previously configured search spaces (e.g., configured coresets 220) in addition to the BFR search space (e.g., the BFR coreset 225). This may prove problematic when there is an overlap between the configured coresets 220 and the BFR coreset 225 during the BFR period.

As another example, conventional techniques may dictate which receive beam the UE uses after the coresets. More particular, for the PDCCH monitoring and for the corresponding PDSCH reception, conventional techniques may include the UE assuming the same antenna quasi co-located (QCL) parameters with an index g_new until the UE receives (by higher layers) an activation for a TCI state or any other parameters (e.g., TCI-StatesPDCCH-ToAddlist and/or TCI-StatesPDCCH-ToReleaseList). In a similar rule, conventional techniques require that before decoding the DCI (e.g., the BFR control signal indicated in the BFR coreset 225), a UE operating in an RRC connected mode may use the default receive beam to receive PDCCH on a corset with the lowest ID and with the TCI state configured in the latest slot with the monitored corsets. However, in a BFR scenario these rules may result in the UE missing the corresponding PDSCH following the BFR control signal.

However, aspects of the described techniques provide a mechanism that improves prioritizations by the UE and/or base station during a BFR event. In one aspect this may include during the BFR recovery period, addressing the situation where the BFR search space (e.g., BFR coreset 225) time occasion overlaps (e.g., at least to some degree) with another previously configured search space (e.g., one or more of configured coresets 220) occasion. If the UE were to choose the receive beam for receiving the previously configured corset (e.g., configured coresets 220), it may not be able to receive the PDCCH carried on the BFR corset 225 in the BFR search space.

The situation is illustrated in slot configuration 200 where a configured coreset 220 overlaps (in the time domain in this example) with the BFR coreset 225 in the control portion 210. In this instance, instead of monitoring the configured coreset 220, the UE may determine that at least one of the configured coresets 220 overlap with the BFR coreset 225 and, instead, may configure a receive beam to receive the control signal over the BFR coreset 225 during the BFR recovery period. That is, in the instance where the configured coreset 220 overlaps with a BFR coreset 225 during the BFR period, the UE may prioritize the BFR coreset 225 for reception to ensure that the BFR procedure can be successfully performed. Accordingly, the UE may receive the control signal (e.g., DCI) over the BFR coreset 225. It is to be understood that aspects of this described technique may be utilized when the configured coreset 220 overlaps with the BFR coreset 225 in the time domain and/or in the frequency domain.

In another approach to resolve this issue, aspects of the described techniques may be implemented at a base station or network. For example, the network may simply refrain from configuring or otherwise allocating any of the configured coresets 220 that overlap with BFR coreset 225. The base station or network may avoid such overlapping configurations permanently (e.g., without regard to whether the BFR event has occurred) and/or as needed (e.g., in response to the occurrence of the BFR event). Accordingly, aspects of the described techniques may improve reception of the control signal over the BFR coreset 225 during the BFR period.

In some aspects, during the BFR period and when the BFR search space (e.g., BFR coreset 225) occasion overlaps with the previously configured search space (e.g., configured coreset 220) occasion, the UE may use the receive beam for receiving the BFR corset 225 to receive the control signal in the BFR search space. In some aspects, the network configuration may ensure that the BFR search space occasion never overlaps with other search space occasions. For example, the network configuration may ensure that there is never any overlap. In another example, the network configuration may ensure that no overlap occurs at least after receiving the BFR request and before receiving an acknowledgment for a MAC CE activation command for a TCI state and/or an RRC reconfiguration for TCI state.

Other problematic areas with respect to conventional techniques include the situation where too many coresets are allocated or otherwise configured. The situation may typically be referred to as overbooking and may include the number of monitored search spaces (e.g., coresets) in a slot exceeding the UE capability. In this instance, conventional techniques require the UE to drop certain search spaces (e.g., certain coresets), with the decision on which search space(s) to drop being based on the search space identifier. As one example, conventional techniques require that the search spaces with the largest identifier are dropped first. In this instance, the UE may drop the BFR search space (e.g., BFR coreset 225) after sending the BFR request and, therefore cannot receive the BFR response.

To address this issue, aspects of the described techniques provide for prioritization of the BFR search space (e.g., BFR coreset 225) in an overbooking scenario. For example, during a BFR event, the UE may determine that the number of coresets (e.g., configured coresets 220 and BFR coresets 225) have exceeded a threshold (e.g., to many coresets are booked for the UE). In response, the UE may prioritize monitoring the BFR coreset 225 over the configured coresets 220 during the BFR period. In some aspects, the dropping may be based on the identifier. For example, in one example the base station may configure the identifier for the BFR coreset 225 to be lower than the identifiers used for the configured coresets 220. In this aspect, the UE may determine the identifier for each coreset and follow the conventional techniques, whereas the BFR coreset 225 having the lowest identifier means that it is the last search space to be dropped. In another example, the UE may simply determine which coreset is the BFR coreset 225, and drop the necessary amount of configured coresets 220 while maintaining the BFR coreset 225.

In some aspects, the BFR search spaces configured to always have a highest monitoring priority even in the presence of overbooking. At the base station or network, this may be implemented by ensuring that the BFR search space has a lowest identifier in every present slot (e.g., such as slot 205). At the UE, this may be implemented by the UE not dropping or otherwise prioritizing and the BFR search space (e.g., the BFR coreset 225).

Figure 3:
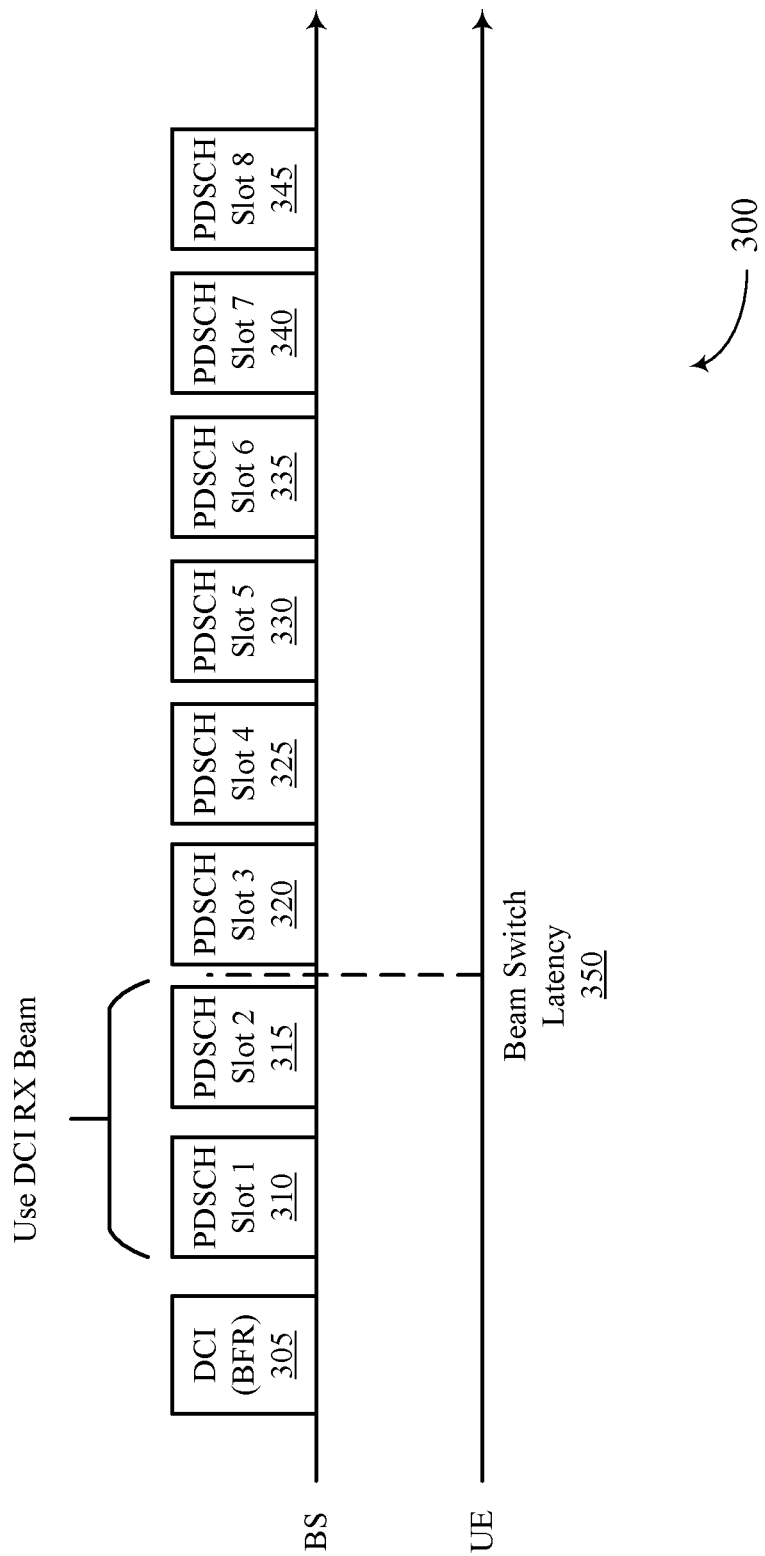
FIG. 3 illustrates an example of a slot configuration in accordance with aspects of the present disclosure.

FIG. 3 illustrates an example of a slot configuration 300 in accordance with aspects of the present disclosure. In some examples, slot configuration 300 may implement aspects of wireless communication system 100 and/or slot configuration 200. Aspects of slot configuration 300 may be implemented by base station and/or UE, which may be examples of the corresponding devices described herein. In some aspects, slot configuration 300 may be implemented in a mmW network.

Generally, slot configuration 300 illustrates an example of a slot that may be used during a BFR event. The slot may span a set of symbols, with nine symbols being shown by way of example only. Generally, the symbol 305 may include or otherwise be associated with a BFR coreset (e.g., a BFR search space). Generally, the symbol 305 may carry a DCI which conveys an indication of a grant and/or one or more configurations to be used for receiving data signals (e.g., PDSCH) during one or more of symbols 310-345. However, a UE may have an associated beam switch latency 350 that generally includes the time between reception of the DCI during the symbol 305 and successfully decoding the DCI to identify the grant and/or configuration information indicated in the DCI. Accordingly, for the symbols 310 and 315, the UE has not have decoded the DCI received in symbol 305, and therefore does not know the configuration information and/or grant information indicated in the DCI. In some aspects, this may be problematic during a BFR event when the DCI schedules data signals during symbol 310 and/or 315.

As discussed above, conventional techniques may require a default receive beam that the UE must use to receive the PDSCH (e.g., data signals) when the scheduling offset is less than the beam switch latency threshold. For example, conventional techniques may require the UE to use a default receive beam to receive the PDCCH on a corset with the lowest identifier and with the TCI state configured in the latest slot with the monitored corsets. However, the BFR corsets may have no configured/valid TCI state during the BFR recovery, so it is therefore not considered in the default receive beam determination. Accordingly, during the BFR recovery the default PDSCH receive beam may not be the same as that receiving the BFR corset, e.g., the receive beam selected based on the selected candidate beam for sending the BFR request on the associated random access channel (RACH) resource. Accordingly, the UE may not receive the PDSCH scheduled by PDCCH in the BFR search space if the scheduling offset is less than the UE beam switch latency threshold.

Accordingly, aspects of the described techniques provide a mechanism that prioritizes or otherwise ensures PDSCH reception scheduled by PDCCH in the BFR search space (e.g., the BFR coreset). For example, a UE may determine that the BFR event has occurred and identify a first receive beam associated with the BFR coreset and a second receive beam (e.g., the default receive beam) associated with the configured coreset. The UE may discard or otherwise reduce the priority for the second receive beam based on the BFR event and, instead, use the first receive beam to receive the BFR control signal and at least a portion of the BFR data signal during the beam switch latency period.

That is, using the techniques described above the UE may identify a transmit beam to use to transmit the BFR request based on a set of candidate beams transmitted by the base station. The UE may identify a receive beam (e.g., the first receive beam) based on the transmit beam used to transmit the BFR request signal. The UE may receive the DCI indicated in symbol 305 using the first receive beam. Conventionally, the UE would be required to switch to the default receive beam (e.g., the second receive beam) starting at symbol 310 since the BFR coreset does not have an active TCI state configured. However, in accordance with aspects of the described techniques the UE may discard, ignore, or otherwise deprioritize the second receive beam during a BFR event. Instead, the UE may continue to use the first receive beam to receive PDSCH in symbol 310 and 315.

Once the UE successively decodes the DCI at the beam switch latency 350, the UE may then know the configured TCI state (e.g., may know which receive beam is configured by the DCI, which may be referred to as third receive beam) and use the third receive beam to receive PDSCH in symbols 320-345.

In some aspects, the base station may determine the beam switch latency threshold for the UE and schedule data signals (e.g., PDSCH) to avoid symbols occurring before the beam switch latency 350. For example, base station may determine that the BFR event has occurred for the UE and identify the beam switch latency period for the UE. The base station may transmit the control signal to the UE (e.g., the DCI on a BFR coreset during symbol 305) and then transmit the data signal (e.g., PDSCH) to the UE during a portion of the slot that occurs after the beam switch latency period of the UE (e.g., in one or more of symbols 320-345). Accordingly, the base station (or network) may avoid the situation where the UE is unable to switch to the first receive beam during symbols 310 and/or 315 based on the conventional techniques, while ensuring that the UE is able to receive the data signals for the BFR procedure during the slot.

In some aspects, during the BFR recovery period the rule for the default PDSCH receive beam may be modified to include, when the BFR search space occasion or equivalently BFR corset is scheduled in the latest slot with the monitored corsets, the UE shall use the receive beam for receiving the BFR corset as the default PDSCH receive beam. Otherwise, the UE may use the default receive beam according to the conventional rule.

In some aspects, the network may ensure scheduling offset between a scheduled PDSCH and the scheduling PDCCH in the BFR search space is no less than the PDSCH beam switch latency threshold of the UE. In one example, the network may always ensure that the offset is no less than the threshold. In another example, the network may ensure that the offset is no less than the beam switch latency threshold at least after receiving the BFR request and before receiving an acknowledgment for a MAC CE activation command for a TCI state or an RRC reconfiguration for TCI state.

In some aspects, during the BFR recovery the UE may use a default PDSCH receive beam as that for receiving the BFR corset from the beginning of each BFR search space occasion to the end of each BFR search space occasion plus the beam switch latency threshold.

Figure 4:
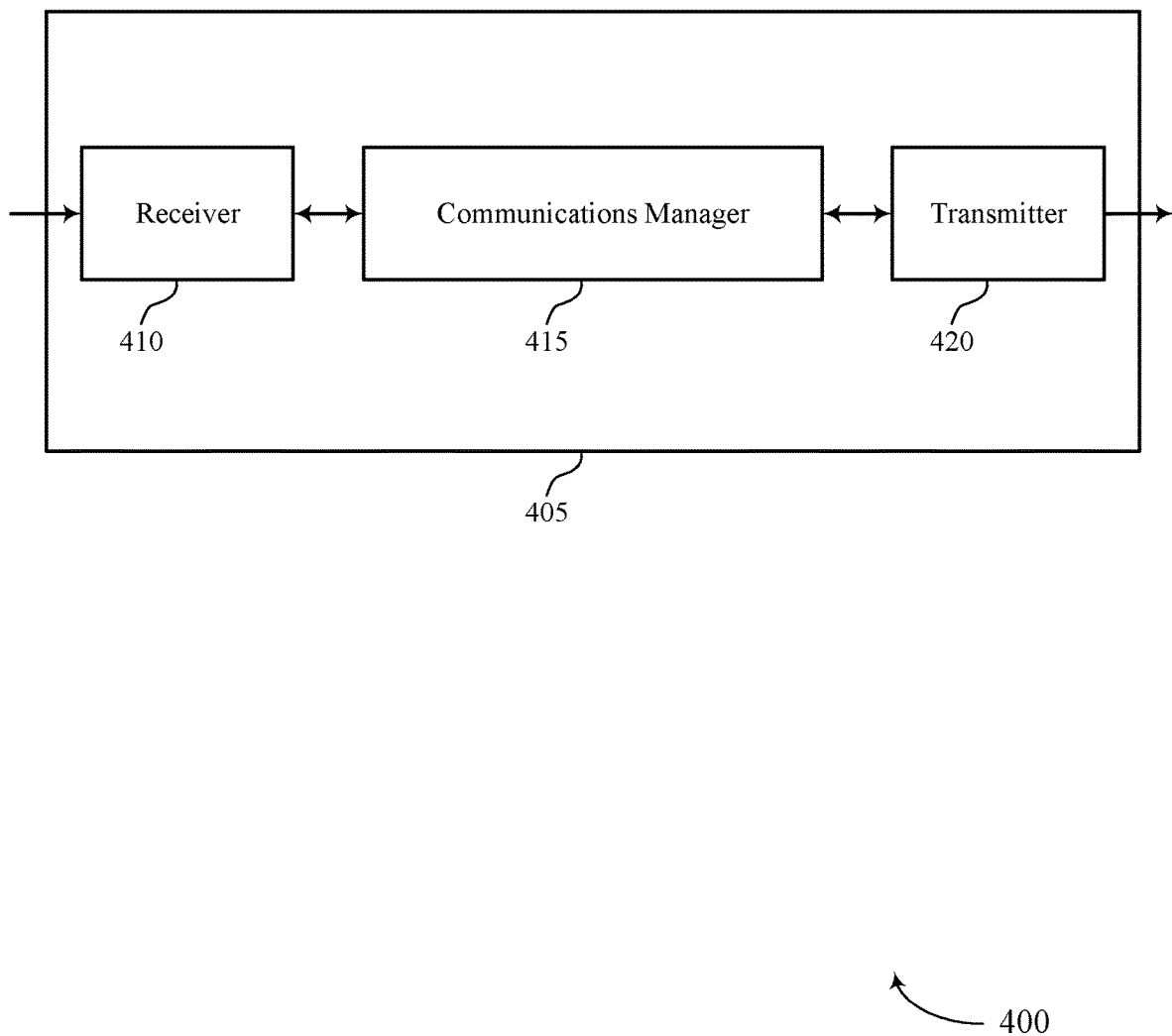
FIGS. 4 and 5 show block diagrams of devices in accordance with aspects of the present disclosure.

FIG. 4 shows a block diagram 400 of a device 405 in accordance with aspects of the present disclosure. The device 405 may be an example of aspects of a UE 115 as described herein. The device 405 may include a receiver 410, a communications manager 415, and a transmitter 420. The device 405 may also include a processor. Each of these components may be in communication with one another (e.g., via one or more buses).

The receiver 410 may receive information such as packets, user data, or control information associated with various information channels (e.g., control channels, data channels, and information related to prioritizations during beam failure recovery, etc.). Information may be passed on to other components of the device 405. The receiver 410 may be an example of aspects of the transceiver 720 described with reference to FIG. 7. The receiver 410 may utilize a single antenna or a set of antennas.

The communications manager 415 may determine, during a beam failure recovery period, that a configured control resource set at least partially overlaps with a beam failure recovery control resource set, configure, based on the at least partial overlap, a receive beam to receive the beam failure recovery control resource set, and receive a control signal over the beam failure recovery control resource set during the beam failure recovery period. The communications manager 415 may also determine that a beam failure event has occurred for the UE, identify, during a beam failure recovery period associated with the beam failure event, a first receive beam associated with a beam failure recovery control resource set and a second receive beam associated with a configured control resource set that is configured for the UE during the beam failure recovery period, discard the second receive beam in response to the occurrence of the beam failure event, and receive, using the first receive beam, a beam failure recovery signal and at least a portion of a beam failure recovery data signal during a beam switch latency period associated with the UE. The communications manager 415 may also determine that a beam failure event has occurred, determine that a number of control resource sets has exceeded a threshold based on the occurrence of the beam failure event, where the control resource sets include a beam failure recovery control resource set and one or more configured control resource sets, and prioritize a monitoring of the beam failure recovery control resource set over the one or more configured control resource sets during a beam failure recovery period. The communications manager 415 may be an example of aspects of the communications manager 710 described herein.

The communications manager 415, or its sub-components, may be implemented in hardware, code (e.g., software or firmware) executed by a processor, or any combination thereof. If implemented in code executed by a processor, the functions of the communications manager 415, or its sub-components may be executed by a general-purpose processor, a DSP, an application-specific integrated circuit (ASIC), a field-programmable gate array (FPGA) or other programmable logic device (PLD), discrete gate or transistor logic, discrete hardware components, or any combination thereof designed to perform the functions described in the present disclosure.

The communications manager 415, or its sub-components, may be physically located at various positions, including being distributed such that portions of functions are implemented at different physical locations by one or more physical components. In some examples, the communications manager 415, or its sub-components, may be a separate and distinct component in accordance with various aspects of the present disclosure. In some examples, the communications manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 420 may transmit signals generated by other components of the device 405. In some examples, the transmitter 420 may be collocated with a receiver 410 in a transceiver module. For example, the transmitter 420 may be an example of aspects of the transceiver 720 described with reference to FIG. 7. The transmitter 420 may utilize a single antenna or a set of antennas.

Figure 5:
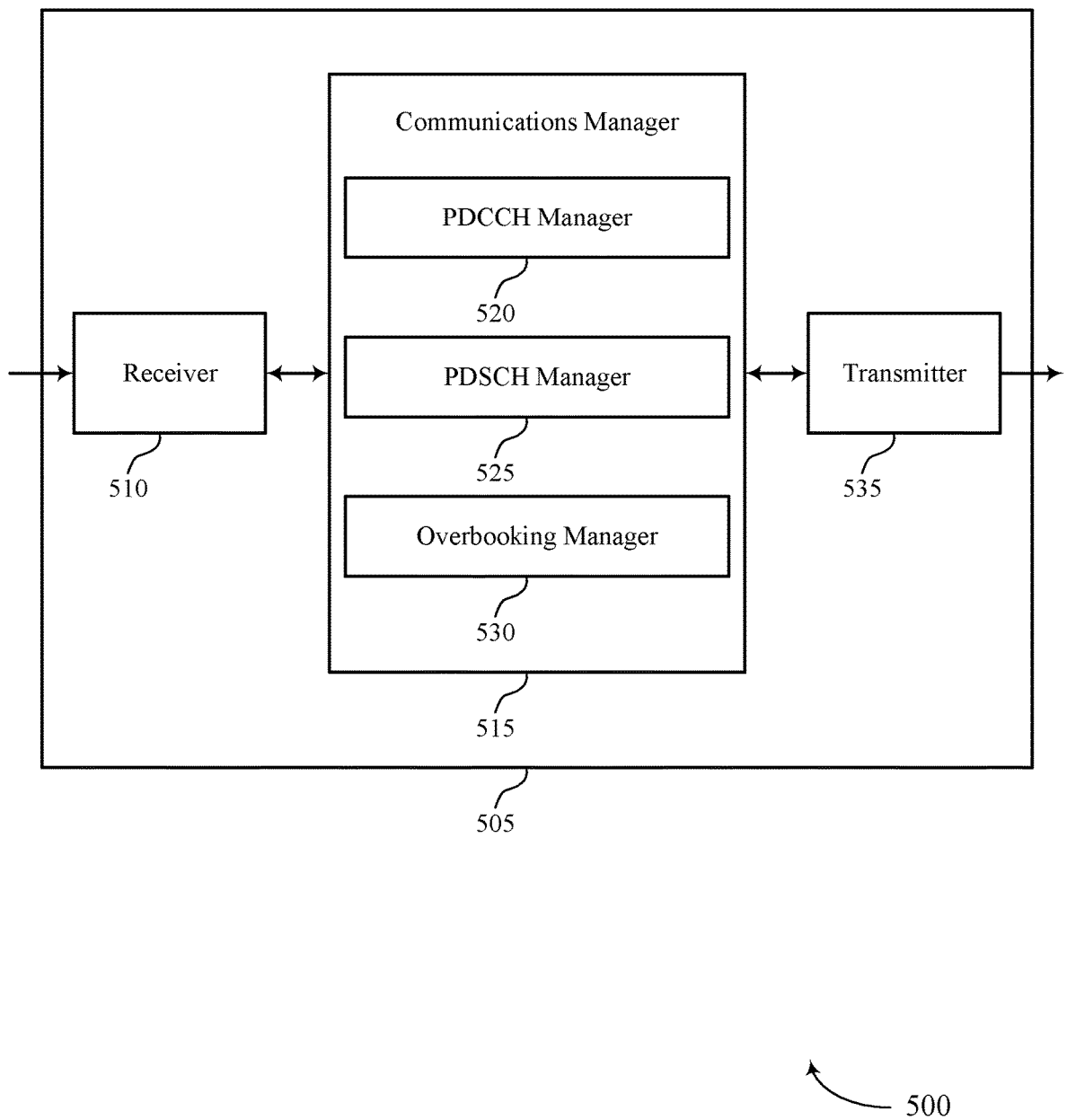

FIG. 5 shows a block diagram 500 of a device 505 in accordance with aspects of the present disclosure. The device 505 may be an example of aspects of a device 405, or a UE 115 as described herein. The device 505 may include a receiver 510, a communications manager 515, and a transmitter 535. The device 505 may also include a processor. Each of these components may be in communication with one another (e.g., via one or more buses).

The receiver 510 may receive information such as packets, user data, or control information associated with various information channels (e.g., control channels, data channels, and information related to prioritizations during beam failure recovery, etc.). Information may be passed on to other components of the device 505. The receiver 510 may be an example of aspects of the transceiver 720 described with reference to FIG. 7. The receiver 510 may utilize a single antenna or a set of antennas.

The communications manager 515 may be an example of aspects of the communications manager 415 as described herein. The communications manager 515 may include a PDCCH manager 520, a PDSCH manager 525, and an overbooking manager 530. The communications manager 515 may be an example of aspects of the communications manager 710 described herein.

The PDCCH manager 520 may determine, during a beam failure recovery period, that a configured control resource set at least partially overlaps with a beam failure recovery control resource set, configure, based on the at least partial overlap, a receive beam to receive the beam failure recovery control resource set, and receive a control signal over the beam failure recovery control resource set during the beam failure recovery period.

The PDSCH manager 525 may determine that a beam failure event has occurred for the UE, identify, during a beam failure recovery period associated with the beam failure event, a first receive beam associated with a beam failure recovery control resource set and a second receive beam associated with a configured control resource set that is configured for the UE during the beam failure recovery period, discard the second receive beam in response to the occurrence of the beam failure event, and receive, using the first receive beam, a beam failure recovery signal and at least a portion of a beam failure recovery data signal during a beam switch latency period associated with the UE.

The overbooking manager 530 may determine that a beam failure event has occurred, determine that a number of control resource sets has exceeded a threshold based on the occurrence of the beam failure event, where the control resource sets include a beam failure recovery control resource set and one or more configured control resource sets, and prioritize a monitoring of the beam failure recovery control resource set over the one or more configured control resource sets during a beam failure recovery period.

The transmitter 535 may transmit signals generated by other components of the device 505. In some examples, the transmitter 535 may be collocated with a receiver 510 in a transceiver module. For example, the transmitter 535 may be an example of aspects of the transceiver 720 described with reference to FIG. 7. The transmitter 535 may utilize a single antenna or a set of antennas.

Figure 6:
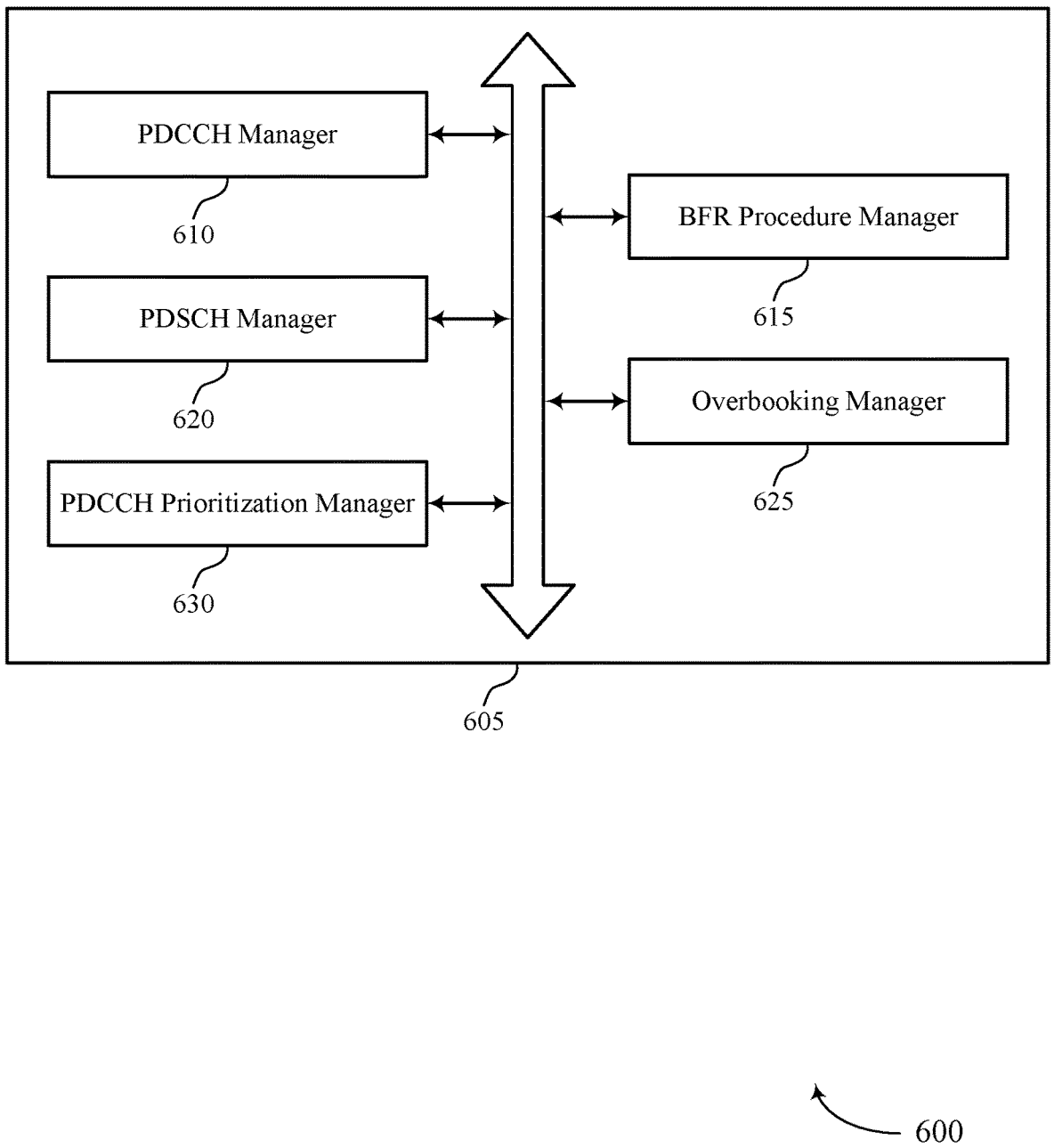
FIG. 6 shows a block diagram of a communications manager in accordance with aspects of the present disclosure.

FIG. 6 shows a block diagram 600 of a communications manager 605 in accordance with aspects of the present disclosure. The communications manager 605 may be an example of aspects of a communications manager 415, a communications manager 515, or a communications manager 710 described herein. The communications manager 605 may include a PDCCH manager 610, a BFR procedure manager 615, a PDSCH manager 620, an overbooking manager 625, and a PDCCH prioritization manager 630. Each of these modules may communicate, directly or indirectly, with one another (e.g., via one or more buses).

The PDCCH manager 610 may determine, during a beam failure recovery period, that a configured control resource set at least partially overlaps with a beam failure recovery control resource set. In some examples, the PDCCH manager 610 may configure, based on the at least partial overlap, a receive beam to receive the beam failure recovery control resource set. In some examples, the PDCCH manager 610 may receive a control signal over the beam failure recovery control resource set during the beam failure recovery period. In some examples, the PDCCH manager 610 may discard the second receive beam when the beam failure recovery control resource set has an associated transmission opportunity in a same slot as the configured control resource set. In some examples, the PDCCH manager 610 may receive, using the first receive beam, the beam failure recovery signal that overlaps with a resource for a downlink or an uplink transmission scheduled by the configured control resource set.

In some examples, the PDCCH manager 610 may transmit an acknowledgement/negative acknowledgement for the scheduled downlink transmission. In some examples, the PDCCH manager 610 may refrain from transmitting an acknowledgement/negative acknowledgement for the scheduled downlink transmission. In some cases, the beam failure recovery period includes a time period between transmitting a beam failure recovery request signal and receiving the control signal, where the control signal includes at least a portion of a beam failure recovery response. In some cases, the beam failure recovery period includes a time period between transmitting a beam failure recovery request signal and receiving a signal activating a transmission configuration information state. In some cases, the signal includes an RRC signal, or a MAC CE, or a combination thereof. In some cases, the at least partial overlap includes a time domain overlap, or a frequency domain overlap, or a combination thereof. In some cases, the control signal includes at least a portion of a beam failure recovery response. In some cases, the configured control signal is associated with a control resource set having a lowest available identifier and an associated transmission configuration information state.

In some cases, the first and second receive beams are associated with receiving PDSCH during at least a portion of the beam switch latency period associated with the UE. In some cases, the configured control resource set scheduling the downlink or the uplink transmission occurs before or after the downlink or the uplink transmission of a beam failure recovery request.

The PDSCH manager 620 may determine that a beam failure event has occurred for the UE. In some examples, the PDSCH manager 620 may identify, during a beam failure recovery period associated with the beam failure event, a first receive beam associated with a beam failure recovery control resource set and a second receive beam associated with a configured control resource set that is configured for the UE during the beam failure recovery period. In some examples, the PDSCH manager 620 may discard the second receive beam in response to the occurrence of the beam failure event. In some examples, the PDSCH manager 620 may receive, using the first receive beam, a beam failure recovery signal and at least a portion of a beam failure recovery data signal during a beam switch latency period associated with the UE.

The overbooking manager 625 may determine that a beam failure event has occurred. In some examples, the overbooking manager 625 may determine that a number of control resource sets has exceeded a threshold based on the occurrence of the beam failure event, where the control resource sets include a beam failure recovery control resource set and one or more configured control resource sets. In some examples, the overbooking manager 625 may prioritize a monitoring of the beam failure recovery control resource set over the one or more configured control resource sets during a beam failure recovery period.

The BFR procedure manager 615 may determine that a beam failure event has occurred. In some examples, the BFR procedure manager 615 may transmit, based on the occurrence of the beam failure event, a beam failure recovery request to a base station using a transmit beam. In some examples, the BFR procedure manager 615 may identify the receive beam based on the transmit beam. In some examples, the BFR procedure manager 615 may monitor a set of candidate beams transmitted from the base station. In some examples, the BFR procedure manager 615 may select the transmit beam from the set of candidate beams. In some examples, the BFR procedure manager 615 may identify, based on the beam failure recovery signal, a third receive beam. In some examples, the BFR procedure manager 615 may receive, using the third receive beam, a second portion of the beam failure recovery data signal after the beam switch latency period associated with the UE.

In some examples, the BFR procedure manager 615 may transmit, based on the occurrence of the beam failure event, a beam failure recovery request to a base station using a transmit beam. In some examples, the BFR procedure manager 615 may identify the first receive beam based on the transmit beam. In some examples, the BFR procedure manager 615 may monitor a set of candidate beams transmitted from the base station. In some examples, the BFR procedure manager 615 may select the transmit beam from the set of candidate beams.

The PDCCH prioritization manager 630 may determine an identifier associated with each control resource set. In some examples, the PDCCH prioritization manager 630 may drop one or more control resource sets based on the corresponding identifier, where an identifier for the beam failure recovery control resource set is lower than identifiers corresponding to the dropped one or more control resource sets. In some examples, the PDCCH prioritization manager 630 may determine that an identifier for at least one of the control resource sets identifies the at least one of the control resource sets as the beam failure recovery control resource set. In some examples, the PDCCH prioritization manager 630 may drop one or more control resource sets other than the beam failure recovery control resource set based on the corresponding identifier.

Figure 7:
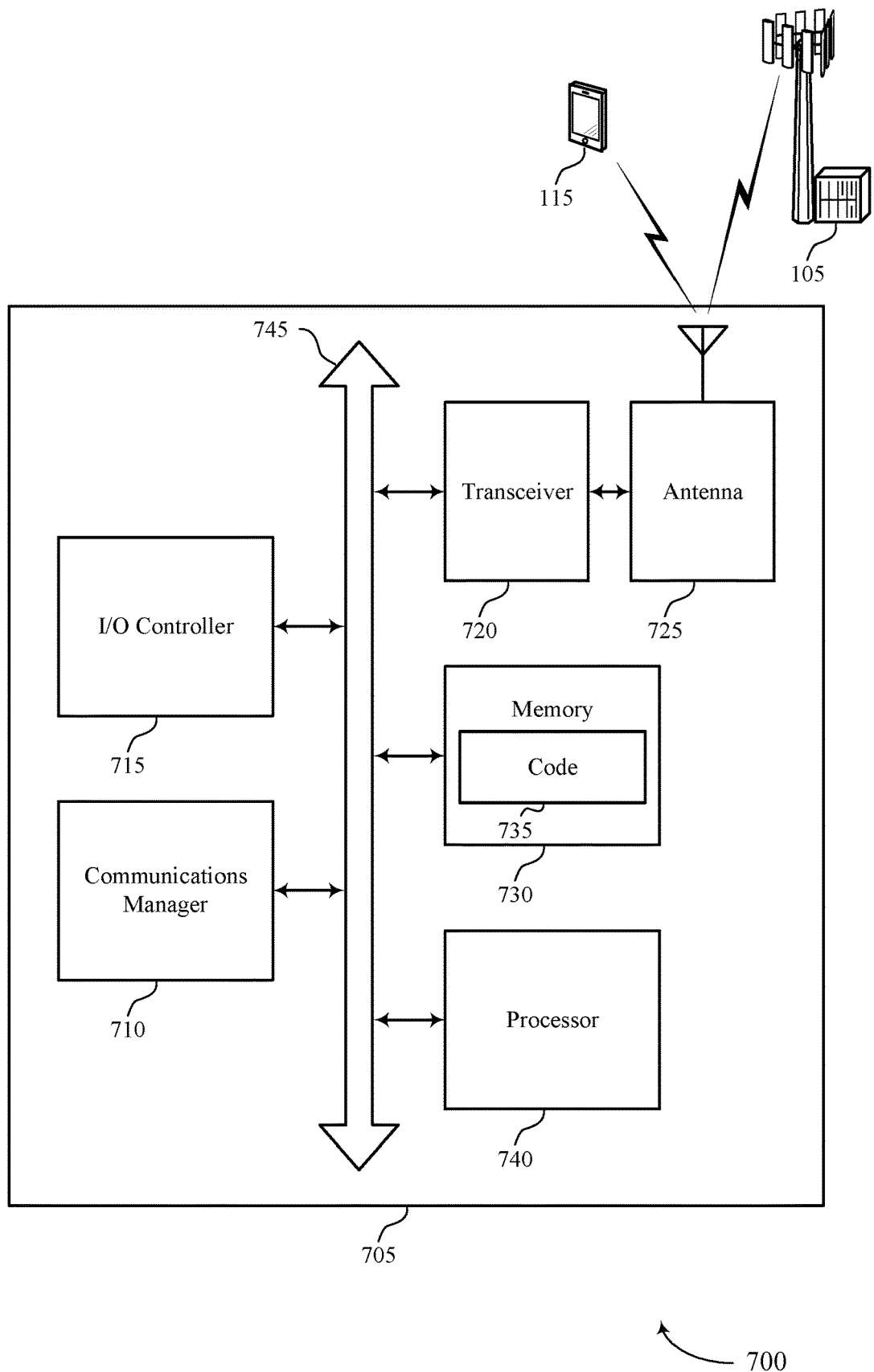
FIG. 7 shows a diagram of a system including a device in accordance with aspects of the present disclosure.

FIG. 7 shows a diagram of a system 700 including a device 705 in accordance with aspects of the present disclosure. The device 705 may be an example of or include the components of device 405, device 505, or a UE 115 as described herein. The device 705 may include components for bi-directional voice and data communications including components for transmitting and receiving communications, including a communications manager 710, an I/O controller 715, a transceiver 720, an antenna 725, memory 730, and a processor 740. These components may be in electronic communication via one or more buses (e.g., bus 745).

The communications manager 710 may determine, during a beam failure recovery period, that a configured control resource set at least partially overlaps with a beam failure recovery control resource set, configure, based on the at least partial overlap, a receive beam to receive the beam failure recovery control resource set, and receive a control signal over the beam failure recovery control resource set during the beam failure recovery period. The communications manager 710 may also determine that a beam failure event has occurred for the UE, identify, during a beam failure recovery period associated with the beam failure event, a first receive beam associated with a beam failure recovery control resource set and a second receive beam associated with a configured control resource set that is configured for the UE during the beam failure recovery period, discard the second receive beam in response to the occurrence of the beam failure event, and receive, using the first receive beam, a beam failure recovery signal and at least a portion of a beam failure recovery data signal during a beam switch latency period associated with the UE. The communications manager 710 may also determine that a beam failure event has occurred, determine that a number of control resource sets has exceeded a threshold based on the occurrence of the beam failure event, where the control resource sets include a beam failure recovery control resource set and one or more configured control resource sets, and prioritize a monitoring of the beam failure recovery control resource set over the one or more configured control resource sets during a beam failure recovery period.

The I/O controller 715 may manage input and output signals for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The transceiver 720 may communicate bi-directionally, via one or more antennas, wired, or wireless links as described above. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas. In some cases, the device 705 may include a single antenna 725. However, in some cases the device 705 may have more than one antenna 725, which may be capable of concurrently transmitting or receiving multiple wireless transmissions.

The memory 730 may include random-access memory (RAM) and read-only memory (ROM). The memory 730 may store computer-readable, computer-executable code 735 including instructions that, when executed, cause the processor to perform various functions described herein. In some cases, the memory 730 may contain, among other things, a basic input/output system (BIOS) which may control basic hardware or software operation such as the interaction with peripheral components or devices.

The processor 740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting prioritizations during beam failure recovery).

The code 735 may include instructions to implement aspects of the present disclosure, including instructions to support wireless communications. The code 735 may be stored in a non-transitory computer-readable medium such as system memory or other type of memory. In some cases, the code 735 may not be directly executable by the processor 740 but may cause a computer (e.g., when compiled and executed) to perform functions described herein.

Figure 8:
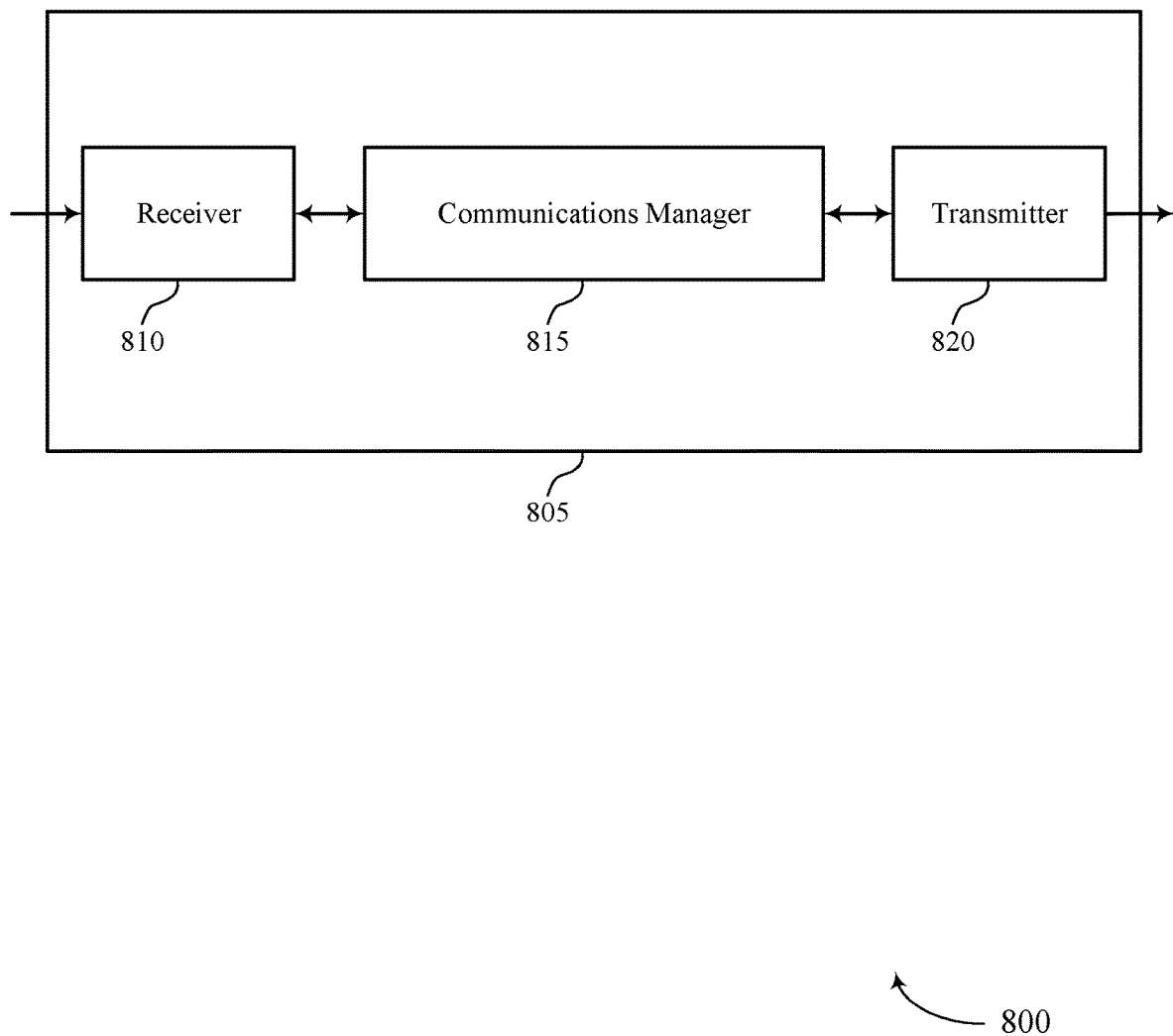
FIGS. 8 and 9 show block diagrams of devices in accordance with aspects of the present disclosure.

FIG. 8 shows a block diagram 800 of a device 805 in accordance with aspects of the present disclosure. The device 805 may be an example of aspects of a base station 105 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to prioritizations during beam failure recovery, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may determine that a beam failure event has occurred for a UE, configure, based on the determining, a beam failure recovery control resource set and one or more configured control resource sets for the UE, where the beam failure recovery control resource set does not overlap with the one or more configured control resource sets, and transmit, based on the determining, a control signal over the beam failure recovery control resource set. The communications manager 815 may also determine that a beam failure event has occurred for a UE, identify a beam switch latency period associated with the UE, transmit, based on the beam failure event occurring, a control signal to the UE, and transmit a data signal to the UE during a portion of the slot that occurs after the beam switch latency period of the UE. The communications manager 815 may also determine that a beam failure event has occurred for a UE, configure a set of control resource sets for the UE based on the determining, where the control resource sets include a beam failure recovery control resource set and one or more configured control resource sets, and select an identifier for each control resource set, where the identifier for the beam failure recovery control resource set is lower than the identifiers for the one or more configured control resource sets. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
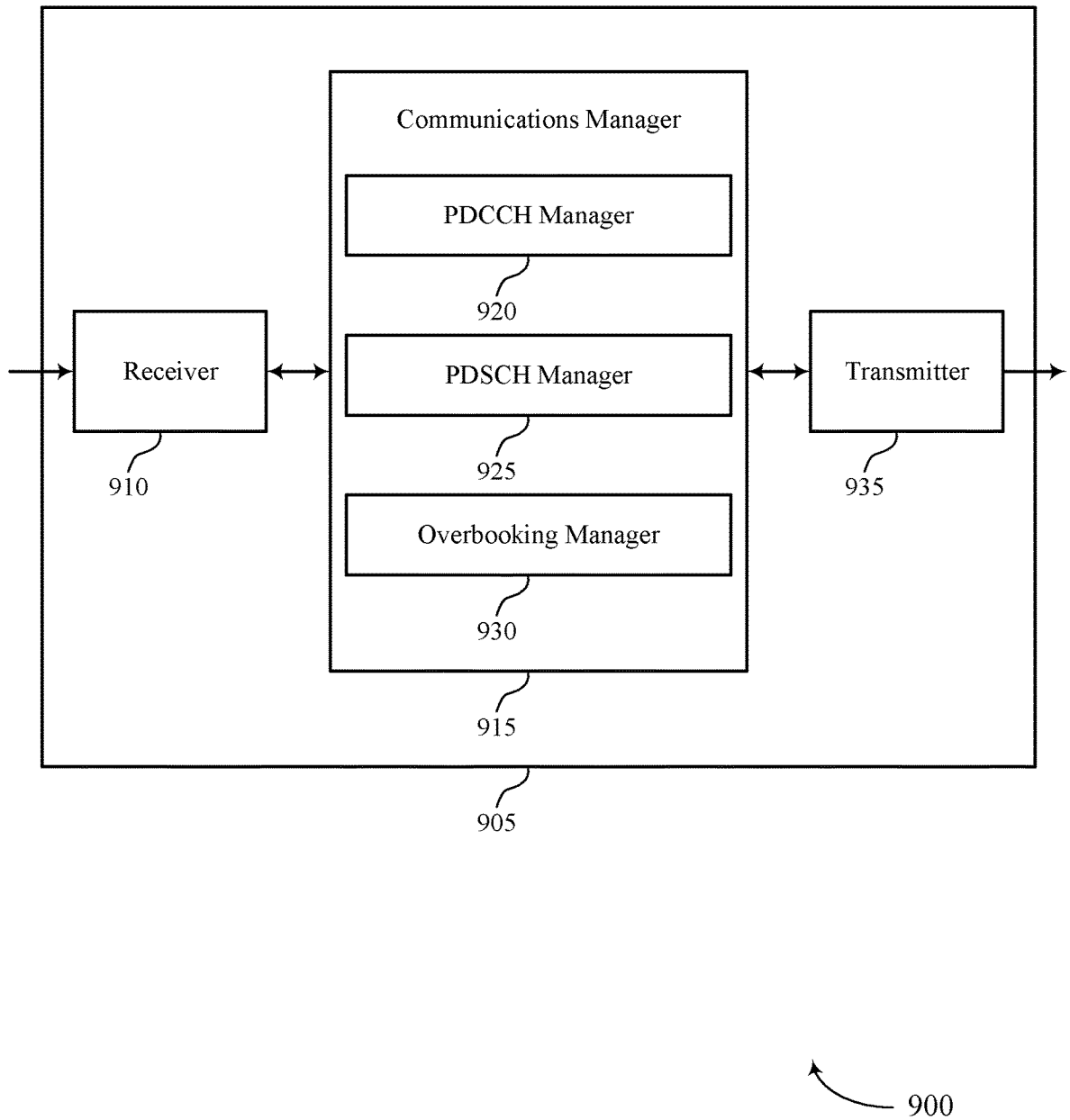

FIG. 9 shows a block diagram 900 of a device 905 in accordance with aspects of the present disclosure. The device 905 may be an example of aspects of a device 805, or a base station 105 as described herein. The device 905 may include a receiver 910, a communications manager 915, and a transmitter 935. The device 905 may also include a processor. Each of these components may be in communication with one another (e.g., via one or more buses).

The receiver 910 may receive information such as packets, user data, or control information associated with various information channels (e.g., control channels, data channels, and information related to prioritizations during beam failure recovery, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a PDCCH manager 920, a PDSCH manager 925, and an overbooking manager 930. The communications manager 915 may be an example of aspects of the communications manager 1110 described herein.

The PDCCH manager 920 may determine that a beam failure event has occurred for a UE, configure, based on the determining, a beam failure recovery control resource set and one or more configured control resource sets for the UE, where the beam failure recovery control resource set does not overlap with the one or more configured control resource sets, and transmit, based on the determining, a control signal over the beam failure recovery control resource set.

The PDSCH manager 925 may determine that a beam failure event has occurred for a UE, identify a beam switch latency period associated with the UE, transmit, based on the beam failure event occurring, a control signal to the UE, and transmit a data signal to the UE during a portion of the slot that occurs after the beam switch latency period of the UE.

The overbooking manager 930 may determine that a beam failure event has occurred for a UE, configure a set of control resource sets for the UE based on the determining, where the control resource sets include a beam failure recovery control resource set and one or more configured control resource sets, and select an identifier for each control resource set, where the identifier for the beam failure recovery control resource set is lower than the identifiers for the one or more configured control resource sets.

The transmitter 935 may transmit signals generated by other components of the device 905. In some examples, the transmitter 935 may be collocated with a receiver 910 in a transceiver module. For example, the transmitter 935 may be an example of aspects of the transceiver 1120 described with reference to FIG. 11. The transmitter 935 may utilize a single antenna or a set of antennas.

Figure 10:
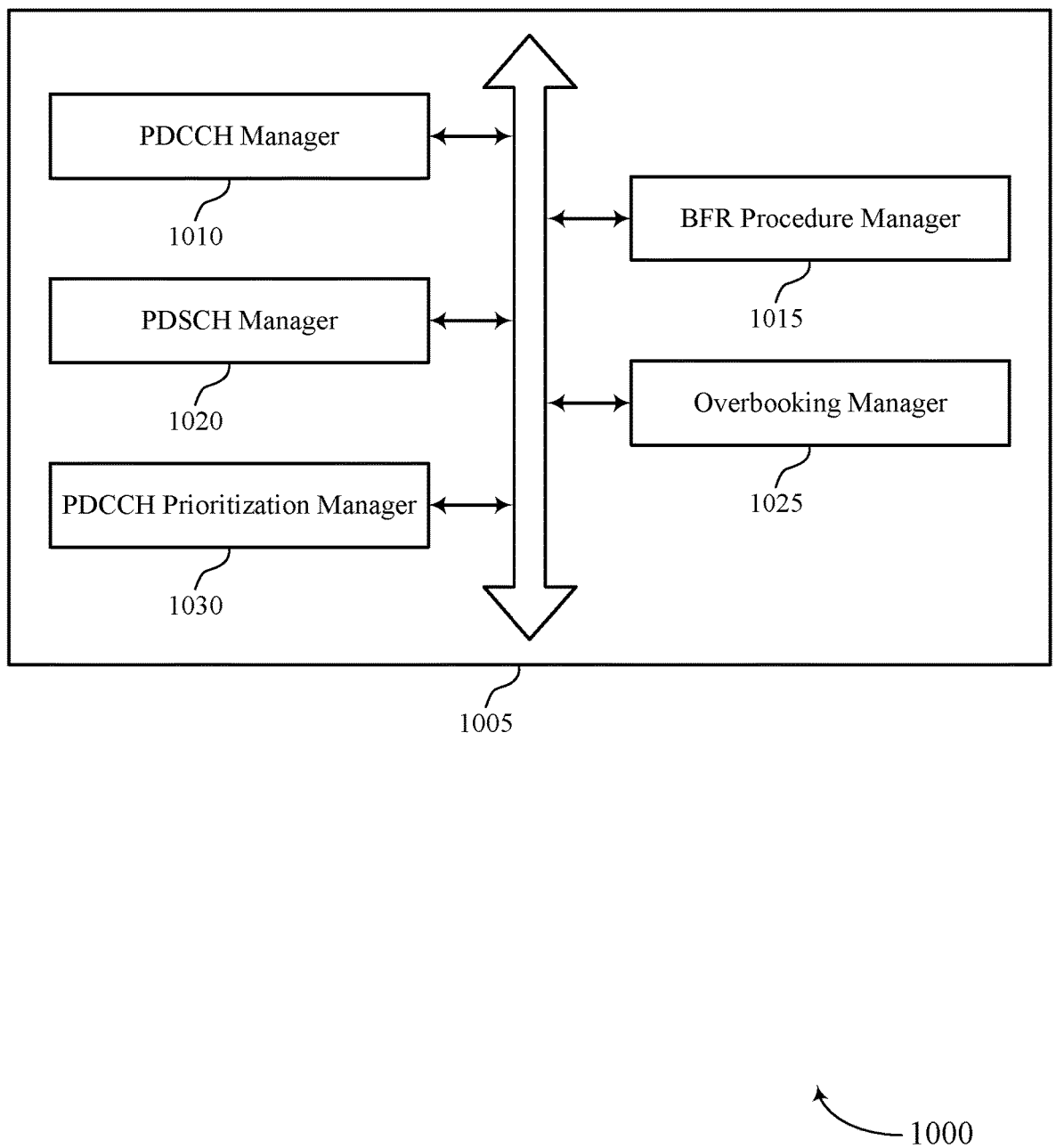
FIG. 10 shows a block diagram of a communications manager in accordance with aspects of the present disclosure.

FIG. 10 shows a block diagram 1000 of a communications manager 1005 in accordance with aspects of the present disclosure. The communications manager 1005 may be an example of aspects of a communications manager 815, a communications manager 915, or a communications manager 1110 described herein. The communications manager 1005 may include a PDCCH manager 1010, a BFR procedure manager 1015, a PDSCH manager 1020, an overbooking manager 1025, and a PDCCH prioritization manager 1030. Each of these modules may communicate, directly or indirectly, with one another (e.g., via one or more buses).

The PDCCH manager 1010 may determine that a beam failure event has occurred for a UE. In some examples, the PDCCH manager 1010 may configure, based on the determining, a beam failure recovery control resource set and one or more configured control resource sets for the UE, where the beam failure recovery control resource set does not overlap with the one or more configured control resource sets. In some examples, the PDCCH manager 1010 may transmit, based on the determining, a control signal over the beam failure recovery control resource set.

The PDSCH manager 1020 may determine that a beam failure event has occurred for a UE. In some examples, the PDSCH manager 1020 may identify a beam switch latency period associated with the UE. In some examples, the PDSCH manager 1020 may transmit, based on the beam failure event occurring, a control signal to the UE. In some examples, the PDSCH manager 1020 may transmit a data signal to the UE during a portion of the slot that occurs after the beam switch latency period of the UE.

The overbooking manager 1025 may determine that a beam failure event has occurred for a UE. In some examples, the overbooking manager 1025 may configure a set of control resource sets for the UE based on the determining, where the control resource sets include a beam failure recovery control resource set and one or more configured control resource sets. In some examples, the overbooking manager 1025 may select an identifier for each control resource set, where the identifier for the beam failure recovery control resource set is lower than the identifiers for the one or more configured control resource sets.

The BFR procedure manager 1015 may receive a beam failure recovery request from the UE, where the occurrence of the beam failure event is based on the beam failure recovery request. In some examples, the BFR procedure manager 1015 may determine to transmit the data signal during the portion of the slot that occurs after the beam switch latency period prior to the occurrence of the beam failure event.

In some examples, the BFR procedure manager 1015 may determine to transmit the data signal during the portion of the slot that occurs after the beam switch latency period prior to the occurrence of the beam failure event in response to the occurrence of the beam failure event. In some cases, the beam failure recovery control resource set and one or more configured control resource sets are configured to not overlap prior to the occurrence of the beam failure event. In some cases, the beam failure recovery control resource set and one or more configured control resource sets are configured to not overlap in response to the occurrence of the beam failure event and during a beam failure recovery period. In some cases, the control signal includes at least a portion of a beam failure recovery response.

The PDCCH prioritization manager 1030 may receive a beam failure recovery request from the UE, where the occurrence of the beam failure event is based on the beam failure recovery request. In some cases, the control signal includes at least a portion of a beam failure recovery response.

Figure 11:
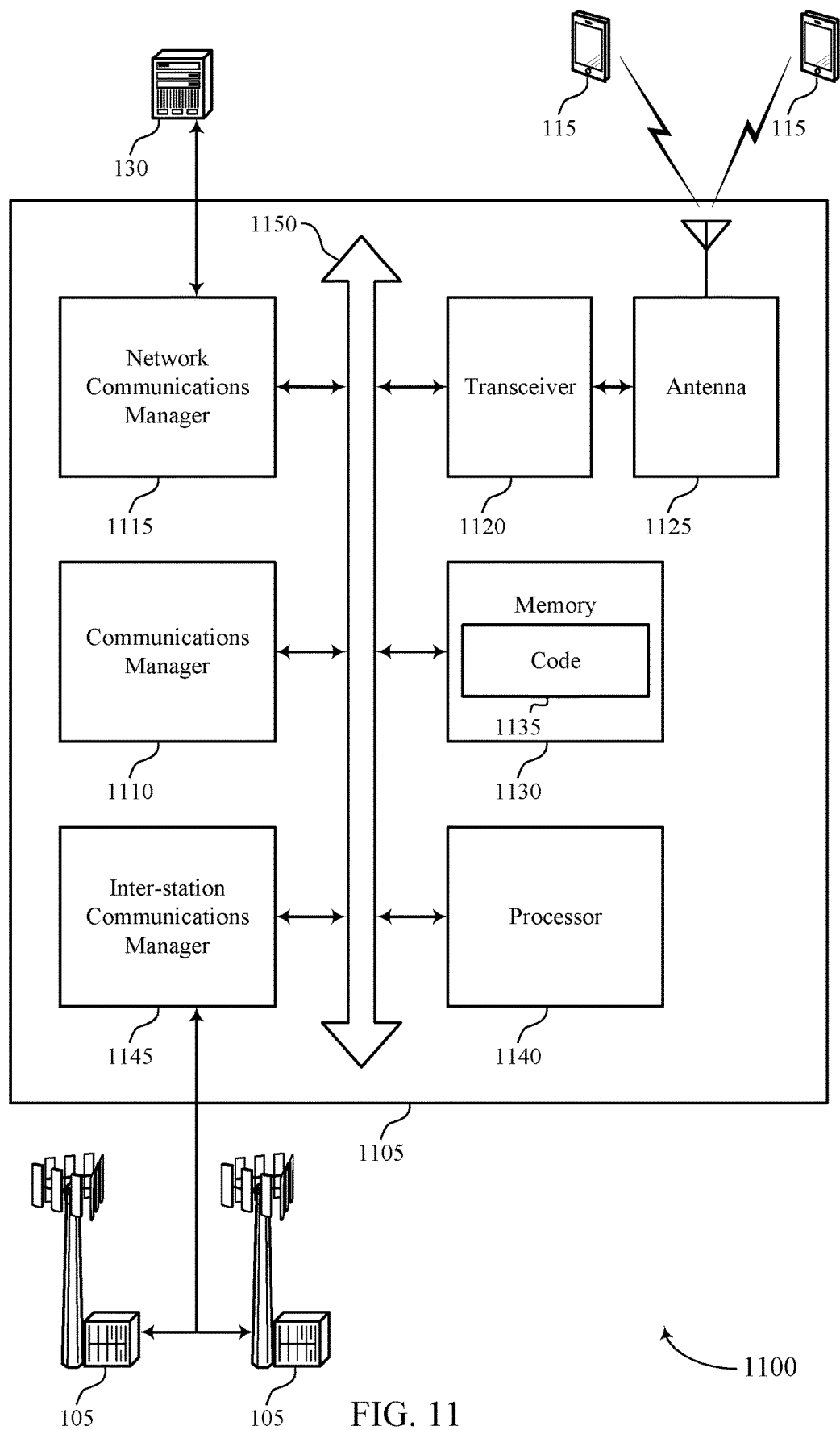
FIG. 11 shows a diagram of a system including a device in accordance with aspects of the present disclosure.

FIG. 11 shows a diagram of a system 1100 including a device 1105 in accordance with aspects of the present disclosure. The device 1105 may be an example of or include the components of device 805, device 905, or a base station 105 as described herein. The device 1105 may include components for bi-directional voice and data communications including components for transmitting and receiving communications, including a communications manager 1110, a network communications manager 1115, a transceiver 1120, an antenna 1125, memory 1130, a processor 1140, and an inter-station communications manager 1145. These components may be in electronic communication via one or more buses (e.g., bus 1150).

The communications manager 1110 may determine that a beam failure event has occurred for a UE, configure, based on the determining, a beam failure recovery control resource set and one or more configured control resource sets for the UE, where the beam failure recovery control resource set does not overlap with the one or more configured control resource sets, and transmit, based on the determining, a control signal over the beam failure recovery control resource set. The communications manager 1110 may also determine that a beam failure event has occurred for a UE, identify a beam switch latency period associated with the UE, transmit, based on the beam failure event occurring, a control signal to the UE, and transmit a data signal to the UE during a portion of the slot that occurs after the beam switch latency period of the UE. The communications manager 1110 may also determine that a beam failure event has occurred for a UE, configure a set of control resource sets for the UE based on the determining, where the control resource sets include a beam failure recovery control resource set and one or more configured control resource sets, and select an identifier for each control resource set, where the identifier for the beam failure recovery control resource set is lower than the identifiers for the one or more configured control resource sets.

The network communications manager 1115 may manage communications with the core network (e.g., via one or more wired backhaul links). For example, the network communications manager 1115 may manage the transfer of data communications for client devices, such as one or more UEs 115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include RAM, ROM, or a combination thereof. The memory 1130 may store computer-readable code 1135 including instructions that, when executed by a processor (e.g., the processor 1140) cause the device to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some cases, a memory controller may be integrated into processor

1140. The processor 1140 may be configured to execute computer-readable instructions stored in a memory (e.g., the memory 1130) to cause the device 1105 to perform various functions (e.g., functions or tasks supporting prioritizations during beam failure recovery).

The inter-station communications manager 1145 may manage communications with other base station 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communication network technology to provide communication between base stations 105.

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
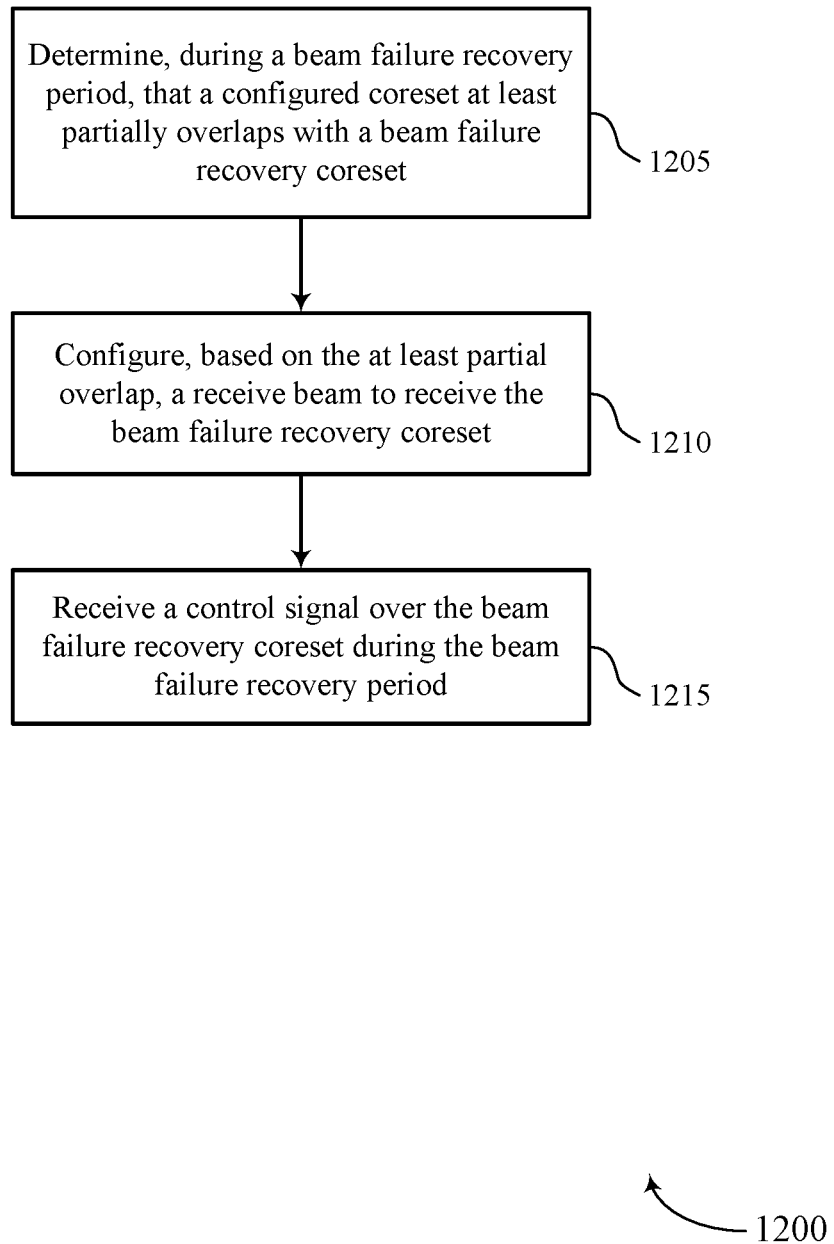
FIGS. 12 through 17 show flowcharts illustrating methods in accordance with aspects of the present disclosure.

FIG. 12 shows a flowchart illustrating a method 1200 in accordance with aspects of the present disclosure. The operations of method 1200 may be implemented by a UE 115 or its components as described herein. For example, the operations of method 1200 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1205, the UE may determine, during a beam failure recovery period, that a configured control resource set at least partially overlaps with a beam failure recovery control resource set. The operations of 1205 may be performed according to the methods described herein. In some examples, aspects of the operations of 1205 may be performed by a PDCCH manager as described with reference to FIGS. 4 through 7.

At 1210, the UE may configure, based on the at least partial overlap, a receive beam to receive the beam failure recovery control resource set. The operations of 1210 may be performed according to the methods described herein. In some examples, aspects of the operations of 1210 may be performed by a PDCCH manager as described with reference to FIGS. 4 through 7.

At 1215, the UE may receive a control signal over the beam failure recovery control resource set during the beam failure recovery period. The operations of 1215 may be performed according to the methods described herein. In some examples, aspects of the operations of 1215 may be performed by a PDCCH manager as described with reference to FIGS. 4 through 7.

Figure 13:
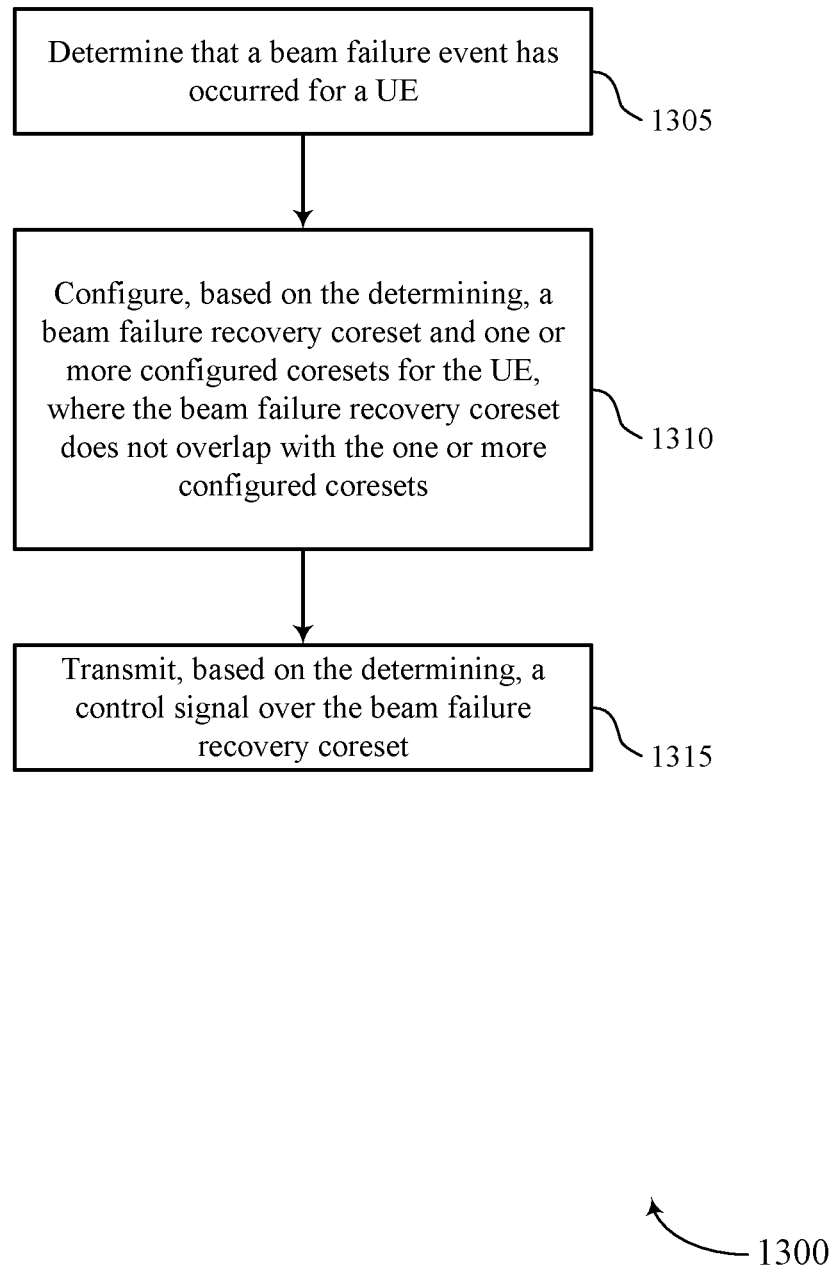

FIG. 13 shows a flowchart illustrating a method 1300 in accordance with aspects of the present disclosure. The operations of method 1300 may be implemented by a base station 105 or its components as described herein. For example, the operations of method 1300 may be performed by a communications manager as described with reference to FIGS. 8 through 11. In some examples, a base station may execute a set of instructions to control the functional elements of the base station to perform the functions described below. Additionally or alternatively, a base station may perform aspects of the functions described below using special-purpose hardware.

At 1305, the base station may determine that a beam failure event has occurred for a UE. The operations of 1305 may be performed according to the methods described herein. In some examples, aspects of the operations of 1305 may be performed by a PDCCH manager as described with reference to FIGS. 8 through 11.

At 1310, the base station may configure, based on the determining, a beam failure recovery control resource set and one or more configured control resource sets for the UE, where the beam failure recovery control resource set does not overlap with the one or more configured control resource sets. The operations of 1310 may be performed according to the methods described herein. In some examples, aspects of the operations of 1310 may be performed by a PDCCH manager as described with reference to FIGS. 8 through 11.

At 1315, the base station may transmit, based on the determining, a control signal over the beam failure recovery control resource set. The operations of 1315 may be performed according to the methods described herein. In some examples, aspects of the operations of 1315 may be performed by a PDCCH manager as described with reference to FIGS. 8 through 11.

Figure 14:
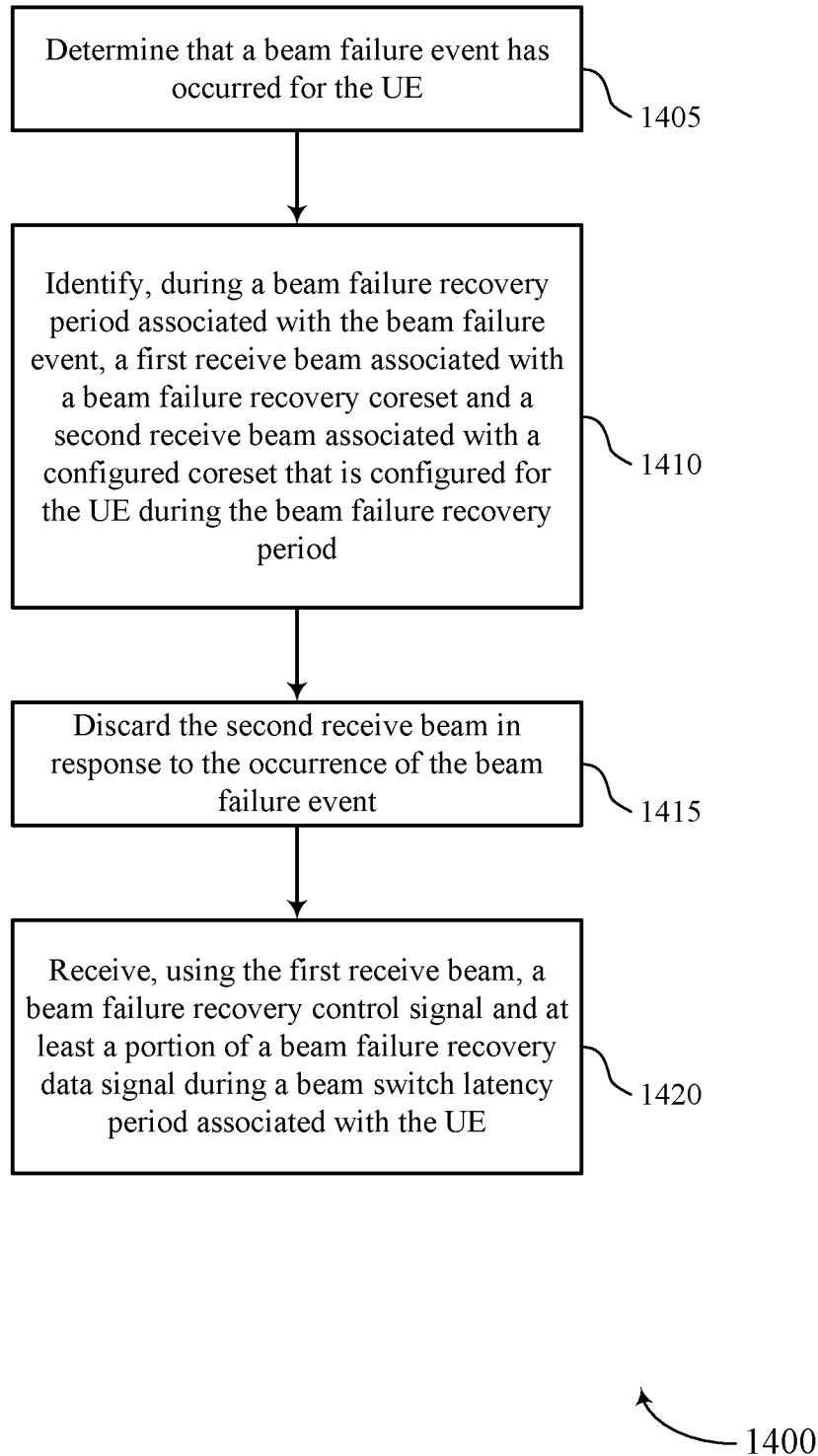

FIG. 14 shows a flowchart illustrating a method 1400 in accordance with aspects of the present disclosure. The operations of method 1400 may be implemented by a UE 115 or its components as described herein. For example, the operations of method 1400 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1405, the UE may determine that a beam failure event has occurred for the UE. The operations of 1405 may be performed according to the methods described herein. In some examples, aspects of the operations of 1405 may be performed by a PDSCH manager as described with reference to FIGS. 4 through 7.

At 1410, the UE may identify, during a beam failure recovery period associated with the beam failure event, a first receive beam associated with a beam failure recovery control resource set and a second receive beam associated with a configured control resource set that is configured for the UE during the beam failure recovery period. The operations of 1410 may be performed according to the methods described herein. In some examples, aspects of the operations of 1410 may be performed by a PDSCH manager as described with reference to FIGS. 4 through 7.

At 1415, the UE may discard the second receive beam in response to the occurrence of the beam failure event. The operations of 1415 may be performed according to the methods described herein. In some examples, aspects of the operations of 1415 may be performed by a PDSCH manager as described with reference to FIGS. 4 through 7.

At 1420, the UE may receive, using the first receive beam, a beam failure recovery signal and at least a portion of a beam failure recovery data signal during a beam switch latency period associated with the UE. The operations of 1420 may be performed according to the methods described herein. In some examples, aspects of the operations of 1420 may be performed by a PDSCH manager as described with reference to FIGS. 4 through 7.

Figure 15:
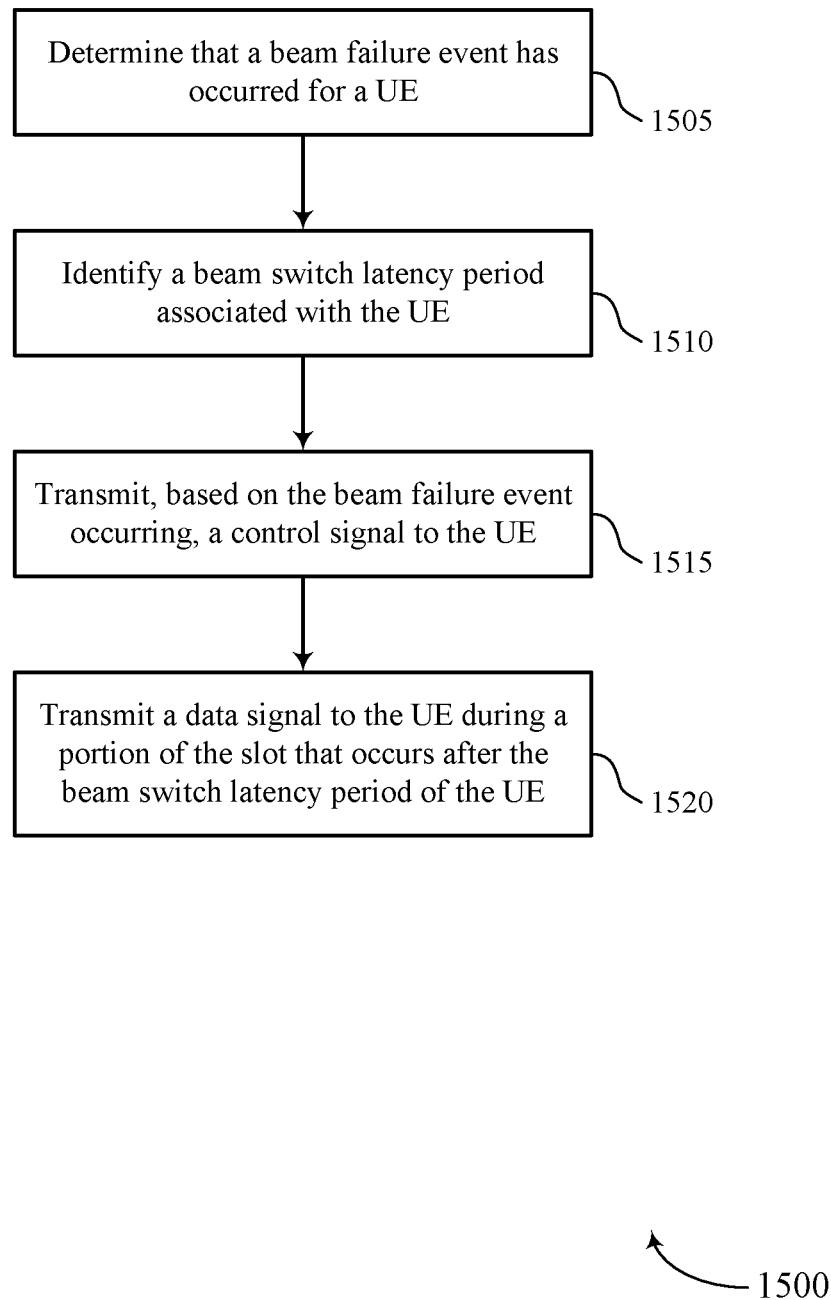

FIG. 15 shows a flowchart illustrating a method 1500 in accordance with aspects of the present disclosure. The operations of method 1500 may be implemented by a base station 105 or its components as described herein. For example, the operations of method 1500 may be performed by a communications manager as described with reference to FIGS. 8 through 11. In some examples, a base station may execute a set of instructions to control the functional elements of the base station to perform the functions described below. Additionally or alternatively, a base station may perform aspects of the functions described below using special-purpose hardware.

At 1505, the base station may determine that a beam failure event has occurred for a UE. The operations of 1505 may be performed according to the methods described herein. In some examples, aspects of the operations of 1505 may be performed by a PDSCH manager as described with reference to FIGS. 8 through 11.

At 1510, the base station may identify a beam switch latency period associated with the UE. The operations of 1510 may be performed according to the methods described herein. In some examples, aspects of the operations of 1510 may be performed by a PDSCH manager as described with reference to FIGS. 8 through 11.

At 1515, the base station may transmit, based on the beam failure event occurring, a control signal to the UE. The operations of 1515 may be performed according to the methods described herein. In some examples, aspects of the operations of 1515 may be performed by a PDSCH manager as described with reference to FIGS. 8 through 11.

At 1520, the base station may transmit a data signal to the UE during a portion of the slot that occurs after the beam switch latency period of the UE. The operations of 1520 may be performed according to the methods described herein. In some examples, aspects of the operations of 1520 may be performed by a PDSCH manager as described with reference to FIGS. 8 through 11.

Figure 16:
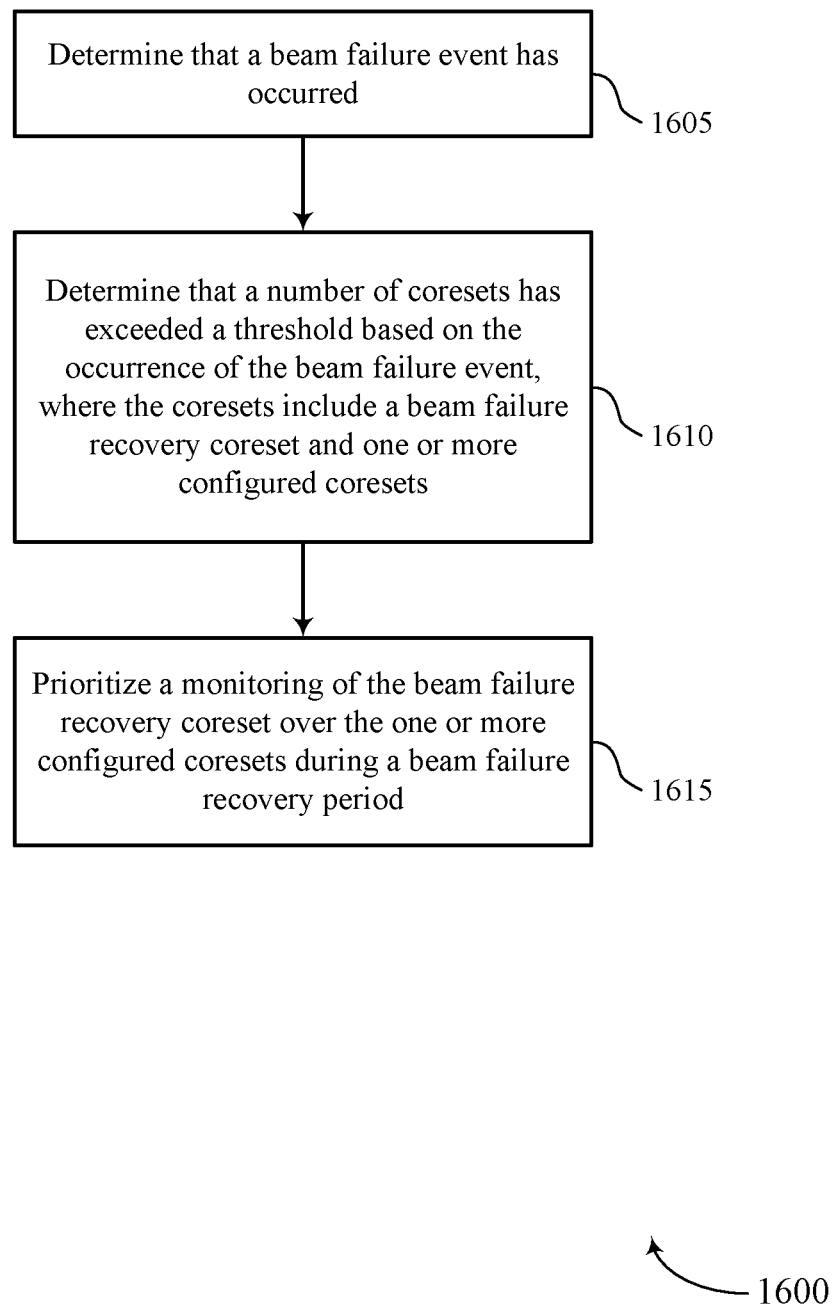

FIG. 16 shows a flowchart illustrating a method 1600 in accordance with aspects of the present disclosure. The operations of method 1600 may be implemented by a UE 115 or its components as described herein. For example, the operations of method 1600 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1605, the UE may determine that a beam failure event has occurred. The operations of 1605 may be performed according to the methods described herein. In some examples, aspects of the operations of 1605 may be performed by an overbooking manager as described with reference to FIGS. 4 through 7.

At 1610, the UE may determine that a number of control resource sets has exceeded a threshold based on the occurrence of the beam failure event, where the control resource sets include a beam failure recovery control resource set and one or more configured control resource sets. The operations of 1610 may be performed according to the methods described herein. In some examples, aspects of the operations of 1610 may be performed by an overbooking manager as described with reference to FIGS. 4 through 7.

At 1615, the UE may prioritize a monitoring of the beam failure recovery control resource set over the one or more configured control resource sets during a beam failure recovery period. The operations of 1615 may be performed according to the methods described herein. In some examples, aspects of the operations of 1615 may be performed by an overbooking manager as described with reference to FIGS. 4 through 7.

Figure 17:
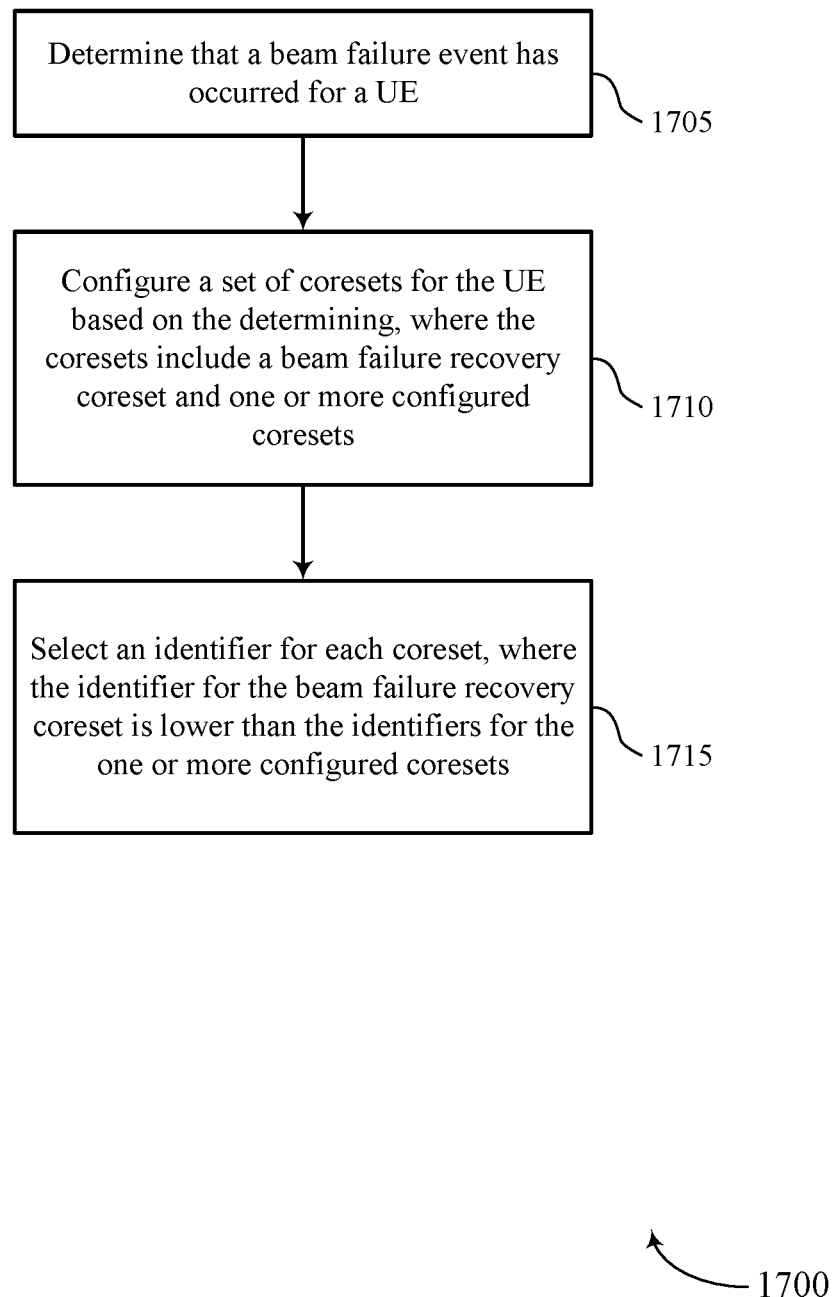

FIG. 17 shows a flowchart illustrating a method 1700 in accordance with aspects of the present disclosure. The operations of method 1700 may be implemented by a base station 105 or its components as described herein. For example, the operations of method 1700 may be performed by a communications manager as described with reference to FIGS. 8 through 11. In some examples, a base station may execute a set of instructions to control the functional elements of the base station to perform the functions described below. Additionally or alternatively, a base station may perform aspects of the functions described below using special-purpose hardware.

At 1705, the base station may determine that a beam failure event has occurred for a UE. The operations of 1705 may be performed according to the methods described herein. In some examples, aspects of the operations of 1705 may be performed by an overbooking manager as described with reference to FIGS. 8 through 11.

At 1710, the base station may configure a set of control resource sets for the UE based on the determining, where the control resource sets include a beam failure recovery control resource set and one or more configured control resource sets. The operations of 1710 may be performed according to the methods described herein. In some examples, aspects of the operations of 1710 may be performed by an overbooking manager as described with reference to FIGS. 8 through 11.

At 1715, the base station may select an identifier for each control resource set, where the identifier for the beam failure recovery control resource set is lower than the identifiers for the one or more configured control resource sets. The operations of 1715 may be performed according to the methods described herein. In some examples, aspects of the operations of 1715 may be performed by an overbooking manager as described with reference to FIGS. 8 through 11.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), FPGA or other PLD, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   determining that a beam failure event has occurred for the UE;
   identifying, during a beam failure recovery period associated with the beam failure event, a first receive beam associated with a beam failure recovery control resource set and a second receive beam associated with a configured control resource set that is configured for the UE during the beam failure recovery period;
   discarding the second receive beam in response to occurrence of the beam failure event; and
   receiving, using the first receive beam, a beam failure recovery signal and at least a portion of a beam failure recovery data signal during a beam switch latency period associated with the UE.

2. The method of claim 1, further comprising:
   identifying, based at least in part on the beam failure recovery signal, a third receive beam; and
   receiving, using the third receive beam, a second portion of the beam failure recovery data signal after the beam switch latency period associated with the UE.

3. The method of claim 1, further comprising:
   transmitting, based at least in part on the occurrence of the beam failure event, a beam failure recovery request to a base station using a transmit beam; and
   identifying the first receive beam based at least in part on the transmit beam.

4. The method of claim 3, further comprising:
   monitoring a set of candidate beams transmitted from the base station; and
   selecting the transmit beam from the set of candidate beams.

5. The method of claim 1, wherein the configured control resource set is associated with a control resource set having a lowest available identifier and an associated transmission configuration information state.

6. The method of claim 1, wherein the first and second receive beams are associated with a receiving physical downlink shared channel (PDSCH) during at least a portion of the beam switch latency period associated with the UE.

7. The method of claim 1, further comprising:
   discarding the second receive beam when the beam failure recovery control resource set has an associated transmission opportunity in a same slot as the configured control resource set.

8. The method of claim 1, further comprising:
   receiving, using the first receive beam, the beam failure recovery signal that overlaps with a resource for a downlink transmission scheduled by the configured control resource set.

9. The method of claim 8, wherein the configured control resource set scheduling the downlink transmission occurs before or after the downlink transmission of a beam failure recovery request.

10. The method of claim 8, further comprising:
    transmitting an acknowledgement for the scheduled downlink transmission.

11. The method of claim 8, further comprising:
    transmitting a negative acknowledgement for the scheduled downlink transmission.

12. The method of claim 8, wherein refraining from transmitting an acknowledgement/negative acknowledgement for the scheduled downlink transmission.

13. The method of claim 1, further comprising:
    receiving, using the first receive beam, the beam failure recovery signal that overlaps with a resource for an uplink transmission scheduled by the configured control resource set.

14. The method of claim 13, wherein the configured control resource set scheduling the uplink transmission occurs before or after the uplink transmission of a beam failure recovery request.

15. An apparatus for wireless communication at a user equipment (UE), comprising:
    at least one processor;
    at least one memory coupled with the at least one processor; and
    instructions stored in the at least one memory and executable by the at least one processor to cause the apparatus to:
    determine that a beam failure event has occurred for the UE;
    identify, during a beam failure recovery period associated with the beam failure event, a first receive beam associated with a beam failure recovery control resource set and a second receive beam associated with a configured control resource set that is configured for the UE during the beam failure recovery period;
    discard the second receive beam in response to occurrence of the beam failure event; and
    receive, using the first receive beam, a beam failure recovery signal and at least a portion of a beam failure recovery data signal during a beam switch latency period associated with the UE.

16. The apparatus of claim 15, wherein the instructions are further executable by the at least one processor to cause the apparatus to:
    identify, based at least in part on the beam failure recovery signal, a third receive beam; and
    receive, using the third receive beam, a second portion of the beam failure recovery data signal after the beam switch latency period associated with the UE.

17. The apparatus of claim 15, wherein the instructions are further executable by the at least one processor to cause the apparatus to:

receive, using the first receive beam, the beam failure recovery signal that overlaps with a resource for an uplink transmission scheduled by the configured control resource set.

18. The apparatus of claim 15, wherein the instructions are further executable by the at least one processor to cause the apparatus to:
transmit, based at least in part on the occurrence of the beam failure event, a beam failure recovery request to a base station using a transmit beam; and
identify the first receive beam based at least in part on the transmit beam.

19. The apparatus of claim 18, wherein the instructions are further executable by the at least one processor to cause the apparatus to:
monitor a set of candidate beams transmitted from the base station; and
select the transmit beam from the set of candidate beams.

20. A non-transitory computer-readable medium storing code for wireless communications, the code comprising instructions executable by one or more processors to:
determine that a beam failure event has occurred for a UE;
identify, during a beam failure recovery period associated with the beam failure event, a first receive beam associated with a beam failure recovery control resource set and a second receive beam associated with a configured control resource set that is configured for the UE during the beam failure recovery period;
discard the second receive beam in response to occurrence of the beam failure event; and
receive, using the first receive beam, a beam failure recovery signal and at least a portion of a beam failure recovery data signal during a beam switch latency period associated with the UE.

\* \* \* \* \*